(12) United States Patent
Jiang et al.

(10) Patent No.: US 12,393,884 B2
(45) Date of Patent: Aug. 19, 2025

(54) TRAINING METHOD AND SYSTEM FOR DECISION TREE MODEL, STORAGE MEDIUM, AND PREDICTION METHOD

(71) Applicant: TENCENT TECHNOLOGY (SHENZHEN) COMPANY LIMITED, Shenzhen (CN)

(72) Inventors: Jiawei Jiang, Shenzhen (CN); Fangcheng Fu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1240 days.

(21) Appl. No.: 17/163,343

(22) Filed: Jan. 29, 2021

(65) Prior Publication Data

US 2021/0150372 A1    May 20, 2021

Related U.S. Application Data

(63) Continuation of application No. PCT/CN2020/115203, filed on Sep. 15, 2020.

(30) Foreign Application Priority Data

Sep. 30, 2019   (CN) .......................... 201910944121.4

(51) Int. Cl.
*G06N 20/20* (2019.01)
*G06F 18/21* (2023.01)
(Continued)

(52) U.S. Cl.
CPC ......... *G06N 20/20* (2019.01); *G06F 18/2163* (2023.01); *G06F 18/24765* (2023.01); *G06F 18/25* (2023.01); *G06N 5/01* (2023.01)

(58) Field of Classification Search
CPC ................................. G06N 5/01; G06N 20/00
See application file for complete search history.

(56) References Cited

U.S. PATENT DOCUMENTS

2011/0307423 A1   12/2011   Shotton et al.
2019/0355124 A1   11/2019   Zhou et al.

FOREIGN PATENT DOCUMENTS

CN         102073546 A     5/2011
CN         102331992 A     1/2012
(Continued)

OTHER PUBLICATIONS

Wang, "CMP: a fast decision tree classifier using multivariate predictions" 2002 (Year: 2002).*

(Continued)

*Primary Examiner* — Van C Mang
(74) *Attorney, Agent, or Firm* — ANOVA LAW GROUP, PLLC

(57) ABSTRACT

This application discloses a method to train a decision tree model. The method is performed by a training system. The training system includes N processing subnodes and a main processing node, N being a positive integer greater than 1. The method includes separately obtaining, by each processing subnode for a currently being trained tree node, a node training feature set and gradient data of the currently being trained tree node; separately determining, by each of the processing subnode, a local splitting rule for the currently being trained tree node according to the node training feature set and the gradient data that are obtained, and transmitting the local splitting rule to the main processing node; and selecting, by the main processing node, a splitting rule corresponding to the currently being trained tree node from the local splitting rule determined by each of the processing subnode.

19 Claims, 15 Drawing Sheets

(51) Int. Cl.
*G06F 18/24* (2023.01)
*G06F 18/25* (2023.01)
*G06N 5/01* (2023.01)

(56) References Cited

FOREIGN PATENT DOCUMENTS

| CN | 104156701 A | 11/2014 |
|---|---|---|
| CN | 108334951 A | 7/2018 |
| CN | 108629685 A | 10/2018 |
| CN | 108875955 A | 11/2018 |
| CN | 109299728 A | 2/2019 |
| CN | 109446251 A | 3/2019 |
| CN | 110728317 A | 1/2020 |
| WO | 2018196631 A1 | 11/2018 |

OTHER PUBLICATIONS

Lin, "Supervised Hashing Using Graph Cuts and Boosted Decision Trees" (Year: 2015).*

The World Intellectual Property Organization (WIPO) International Search Report for PCT/CN2020/115203 Nov. 30, 2020 8 Pages (including translation).
Tianqi Chen et al., "XGBoost: A Scalable Tree Boosting System," SIGKDD 2016, pp. 785-794. 10 pages.
Guolin Ke et al., "LightGBM: A Highly Efficient Gradient Boosting Decision Tree," NIPS 2017. 9 pages.
Jerome Friedman et al., "Additive logistic regression: a statistical view of boosting," Annals of statistics 2000, pp. 337-407. 71 pages.
Michael Greenwald et al., "Space-efficient online computation of quantile summaries," SIGMOD 2001, pp. 58-66. 9 pages.
The State Intellectual Property Office of the People's Republic of China (SIPO) Office Action 1 for 201910944121.4 Feb. 9, 2021 15 Pages (including translation).
Jia-Wei Jiang et al., "Distributed Gradient Boosting Decision Tree Algorithm for High-dimensional and Multi-classification Problems," Journal of software vol. 30, No. 3, Mar. 31, 2019 (Mar. 31, 2019), pp. 784-798. 15 pages.
Jiawei Jiang et al., "DimBoost: Boosting Gradient Boosting Decision Tree to Higher Dimensions," SIGMOD 18: Proceedings of the 2018 International Conference on Management of Data, Jun. 15, 2018 (Jun. 15, 2018). 14 pages.

* cited by examiner

TRAINING METHOD AND SYSTEM FOR DECISION TREE MODEL, STORAGE MEDIUM, AND PREDICTION METHOD

RELATED APPLICATIONS

This application claims priority to PCT Application No. PCT/CN2020/115203, filed on Sep. 15, 2020, which in turn claims priority to Chinese Patent Application No. 201910944121.4, entitled "TRAINING METHOD AND SYSTEM FOR DECISION TREE MODEL, STORAGE MEDIUM, AND PREDICTION METHOD" and filed with the China National Intellectual Property Administration on Sep. 30, 2019, content of both of which is incorporated herein by reference in its entirety.

FIELD OF THE TECHNOLOGY

This application relates to the field of artificial intelligence (AI) technologies, and in particular, to a training method and system for a decision tree model, a storage medium, and a prediction method.

BACKGROUND OF THE DISCLOSURE

With the research and progress of the AI technologies, the AI technologies are studied and applied in an increasing number of fields. In various applications, an important task of an AI technology is model training. To improve the efficiency of model training, currently, a parallel distributed data training system is often used for training a model. That is, training data is assigned to a plurality of processing subnodes, and each processing subnode iteratively trains the model according to the assigned training data.

When the parallel distributed data training system is used for training a decision tree model, sample data is assigned to all the processing subnodes, sample data of only some samples is stored on each of the processing subnode, and each of the processing subnode, based on the assigned sample data statistics, obtains a local gradient histogram. Then, local gradient histograms obtained by all the processing subnodes are collected, a global gradient histogram corresponding to all the sample data is determined, and an optimal splitting rule is determined based on the global gradient histogram. However, a large amount of communication resources is consumed for transmitting the gradient histograms, and a large amount of memory overhead is needed for storing the global gradient histogram.

SUMMARY

Embodiments of this application provide a training method and system for a decision tree model, a storage medium, and a prediction method, to reduce the quantity of data transmitted between processing nodes in a distributed training process, and reduce system resource overheads.

One aspect of the present disclosure provides a training method for a decision tree model, performed by a training system. The training system comprises N processing subnodes and a main processing node, N being a positive integer greater than 1. The method includes separately obtaining, by each processing subnode for a currently being trained tree node, a node training feature set and gradient data of the currently being trained tree node, the gradient data being gradient data of a feature matrix of the decision tree model, the node training feature set being determined by a splitting rule of a previously trained tree node and a feature subset of the processing subnode, the feature subset comprising a plurality of feature columns $T_j$, the feature columns $T_j$ comprising feature values of features j of all samples, respective feature subsets of the N processing subnodes forming the feature matrix, and the feature subsets of the N processing subnodes not intersecting with each other; separately determining, by each of the processing subnode, a local splitting rule for the currently being trained tree node according to the node training feature set and the gradient data that are obtained, and transmitting the local splitting rule to the main processing node, the local splitting rule comprising a feature and a feature value that maximize a gain of an objective function; and selecting, by the main processing node, a splitting rule corresponding to the currently being trained tree node from the local splitting rule determined by each of the processing subnode.

Another aspect of the present disclosure provides a training system for a decision tree model, including N processing subnodes and a main processing node, N being a positive integer greater than 1.

A training system for a decision tree model, comprising N processing subnodes and a main processing node, N being a positive integer greater than 1. Each processing subnode is configured to obtain, for a currently being trained tree node, a node training feature set and gradient data of the currently being trained tree node, the gradient data being gradient data of a feature matrix of the decision tree model, the node training feature set being determined by a splitting rule of a previously trained tree node and a feature subset of the processing subnode, the feature subset comprising a plurality of feature columns $T_j$, the feature columns $T_j$ comprising feature values of features j of all samples, respective feature subsets of the N processing subnodes forming the feature matrix, and the feature subsets of the N processing subnodes not intersecting with each other.

Each of the processing subnode is further configured to: determine a local splitting rule for the currently being trained tree node according to the node training feature set and the gradient data that are obtained, and transmit the local optimal splitting rule to the main processing node, the local splitting rule comprising a feature and a feature value that maximize a gain of an objective function.

The main processing node is configured to select a splitting rule corresponding to the currently being trained tree node from the local splitting rule determined by each of the processing subnode.

Another aspect of the present disclosure provides a computer-readable storage medium, storing computer program instructions, the computer program instructions, when being executed by a processor, implementing the foregoing training method for a decision tree model, or the foregoing prediction method based on a decision tree model.

BRIEF DESCRIPTION OF THE DRAWINGS

To describe the technical solutions in the embodiments of this application more clearly, the following briefly describes the accompanying drawings required in the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1A:
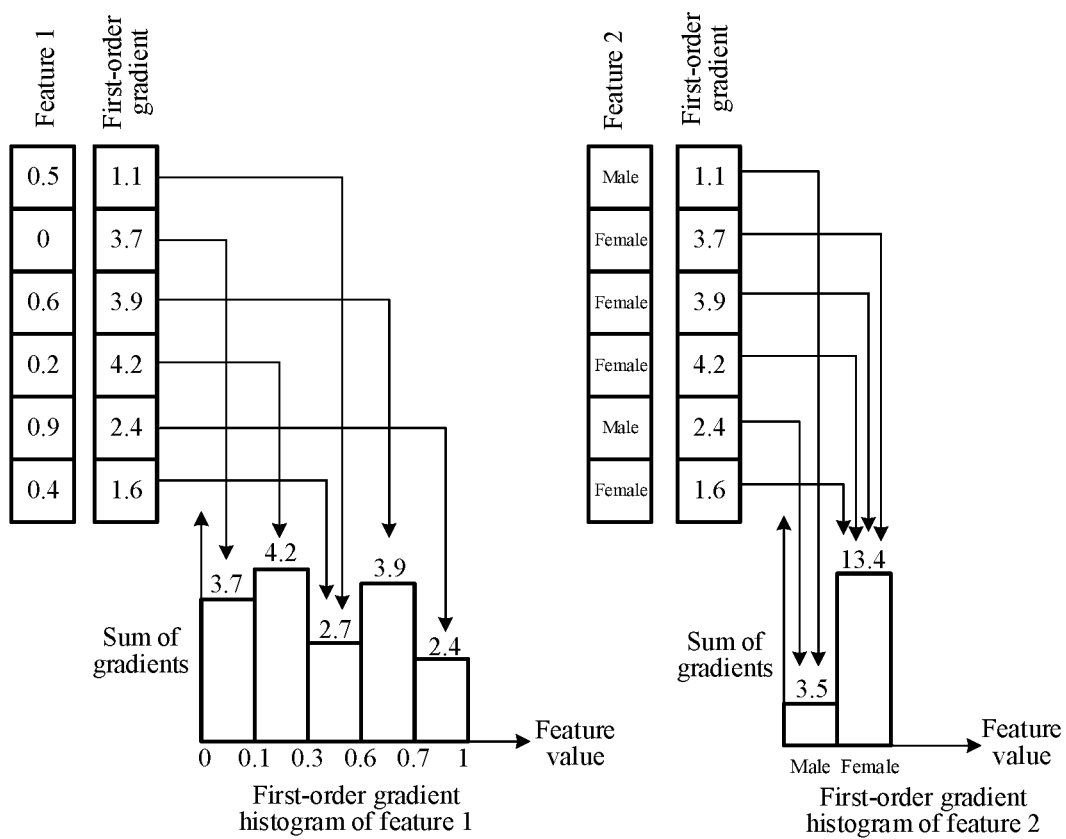
FIG. 1A is an example of a gradient histogram obtained based on a feature matrix and gradient data.

To make the objectives, technical solutions, and advantages of the embodiments of this application more comprehensible, the following clearly and completely describes the technical solutions in the embodiments of this application with reference to the accompanying drawings in the embodiments of this application.

To better illustrate the embodiments, the following explains terms involved in the embodiments of this application.

Artificial Intelligence (AI) is a theory, method, technology, and application system that uses a computer or a machine controlled by the digital computer to simulate, extend, and expand human intelligence, perceive an environment, acquire knowledge, and use knowledge to obtain an optimal result. In other words, AI refers to a comprehensive technology of computer science, which endeavors to understand essence of intelligence and produces a new intelligent machine that responds in a manner similar to human intelligence. AI is to study the design principles and implementation methods of various intelligent machines, to enable the machines to have the functions of perception, reasoning, and decision-making.

AI technology is a broad discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major area such as computer vision technology, speech processing technology, natural language processing technology, and machine learning/deep learning.

Machine learning (ML) is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure, to keep improving its performance. ML is a core of the AI, is a basic way to make the computer intelligent, and is applied to various fields of the AI. ML and deep learning generally include technologies such as artificial neural networks, a belief network, reinforcement learning, transfer learning, inductive learning, and learning from demonstrations.

With the research and progress of the AI technology, the AI technology is studied and applied to a plurality of fields, such as in a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

In distributed ML, ML tasks are executed in a distributed environment. For example, training data is assigned to a plurality of processing subnodes, and each processing subnode iteratively trains the model by using the assigned training data.

A gradient boosting decision tree (GBDT) algorithm uses the decision tree model as a weak classifier to sequentially train a plurality of decision trees. Policies such as boosting are used for improving the importance of misjudged data, thereby continuously improving the precision of the decision tree model. One decision tree model may include a plurality of decision trees, and each decision tree includes two tree nodes: an internal tree node and a leaf node. The internal tree node provides a splitting rule, to assign data to a left child node or a right child node of the internal tree node. The splitting rule may be a range of continuous features or a category feature. Through the layer-by-layer processing of the internal tree node, a predicted value of a decision tree on data may be obtained until the data is assigned to the leaf node, and predicted values of other decision trees on the data are obtained in the same manner. The predicted values given by all the decision trees are accumulated, to obtain a final predicted value of the data.

Similar to a conventional linear model or deep model, the GBDT aims to minimize the error between an actual value and a predicted value. Therefore, this is also formulated into an optimization problem, whose objective function is defined as:

$$F^{(t)} = \sum_{i=1}^{N} l(y_i, \hat{y}_i^{(t)}) + \Omega(f_t) = \sum_{i=1}^{N} l(y_i, \hat{y}_i^{(t-1)} + f_t(x_i)) + \Omega(f_t),$$

where l is a cost function (for example, a logistic loss or root mean square error (RMSE) function), and $\Omega$ is a regularization term whose value is usually:

$$\Omega(f_S)=\gamma L+\tfrac{1}{2}\lambda\|\omega\|^2,$$

where L is the quantity of leaf nodes in a decision tree, $\Omega$ is a vector formed by predicted values of the leaf nodes, and $\gamma$ and $\lambda$ are hyper-parameters.

In a LogitBoost algorithm, a second-order approximation is used, and gradients are introduced. If $g_i$ represents a first-order gradient, and $h_i$ represents a second-order gradient, $$F^{(t)} \approx \sum_{i=1}^{N}\left[l(y_i, \hat{y}_i^{(t-1)}) + g_i f_t(x_i) + \frac{1}{2}h_i f_t^2(x_i)\right] + \Omega(f_t).$$

If $I_j=\{i|x_i \in \text{leaf}_j\}$ represents a sample on a $j^{th}$ leaf node, $\omega_j$ replaces $f_t(x_i)$, and a constant term (a cost function) is deleted, an approximation of $F^{(t)}$ may be obtained:

$$\tilde{F}^{(t)} \approx \sum_{j=1}^{L}\left[\left(\sum_{i\in I_j}g_i\right)\omega_j + \frac{1}{2}\left(\sum_{i\in I_j}h_i + \lambda\right)\omega_j^2\right] + \gamma L.$$

The foregoing conversion may be understood as follows: original $F^{(t)}$ sequentially processes the samples, and calculates a predicted value of each sample, and the rewritten $\tilde{F}^{(t)}$ sequentially processes the leaf nodes, and performs batch processing on the samples on the leaf nodes.

The foregoing formula has a linear term and a quadratic term of $\omega_j$, and $\omega_j$ that minimizes $\omega_j$ may be easily obtained:

$$\omega_j^* = -\frac{\Sigma_{i\in I_j}g_i}{\Sigma_{i\in I_j}h_i+\lambda},\ \tilde{F}^* = -\frac{1}{2}\sum_{j=1}^{L}\frac{(\Sigma_{i\in I_j}g_i)^2}{\Sigma_{i\in I_j}h_i+\lambda} + \gamma L.$$

A predicted value $\omega^*_j$ corresponding to each leaf node of the decision tree may be obtained by using the foregoing formula.

The strict theoretical deduction is given above, but is based on an assumption that a tree structure is known, and a leaf node to which each sample belongs is known. However, in reality, the tree structure is unknown. To obtain an optimal solution, all possible tree structures need to be traversed. Such calculation complexity is obviously infeasible. Therefore, the GBDT uses a greedy method for training the decision tree to get the tree structure: continually splitting the tree node downward starting from the root node. The splitting the tree node is determining a splitting rule of the tree node, and assigning samples on the tree node to two child nodes of the tree node according to the splitting rule; and selecting, for each tree node, a feature and a feature value that minimize $\tilde{F}^{(t)}$ as the splitting rule based on feature values and gradient data of the samples on the tree node, so as to obtain the tree structure of the decision tree.

In a gradient histogram, a horizontal axis is the feature value of the sample, and a vertical axis is a sum of gradients of the samples. A feature value corresponding to a feature j of an $i^{th}$ sample is stored in an $i^{th}$ row and a $j^{th}$ column in a feature matrix, a first-order gradient corresponding to an $i^{th}$ sample is stored in an $i^{th}$ row and a first column in the gradient data, and a second-order gradient corresponding to an $i^{th}$ sample is stored in an $i^{th}$ row and a second column in the gradient data. First, K candidate feature values are selected for each feature. Then, all data samples on the tree node are scanned, and gradient data of the samples are used for establishing a gradient histogram for each feature. For example, $G_m$ is a first-order gradient histogram of an $m^{th}$ feature. If a feature value of the $m^{th}$ feature of the sample is located between a $(k-1)^{th}$ candidate feature value $s_{m,(k-1)}$ and a $k^{th}$ candidate feature value $s_{m,k}$, a first-order gradient of the sample is added to $G_{m,k}$. By using the same operation, a second-order gradient histogram $H_m$ is obtained. After such processing is performed, m first-order gradient histograms of the size k and m second-order gradient histograms of the size k are established on each tree node, respectively. FIG. 1A is an example of a method for obtaining a gradient histogram (including a first-order gradient histogram and a second-order gradient histogram) of each feature based on a feature matrix and gradient data of a sample.

When a parallel distributed data training system is used for training the decision tree model, the sample data is assigned to each processing subnode based on rows, sample data of only some samples is stored on each of the processing subnode, and each of the processing subnode performs statistics based on the assigned sample data, to obtain a local gradient histogram; and then, local gradient histograms obtained by all the processing subnodes are collected, a global gradient histogram corresponding to all the sample data is determined, and an optimal splitting rule is determined based on the global gradient histogram.

Figure 1B:
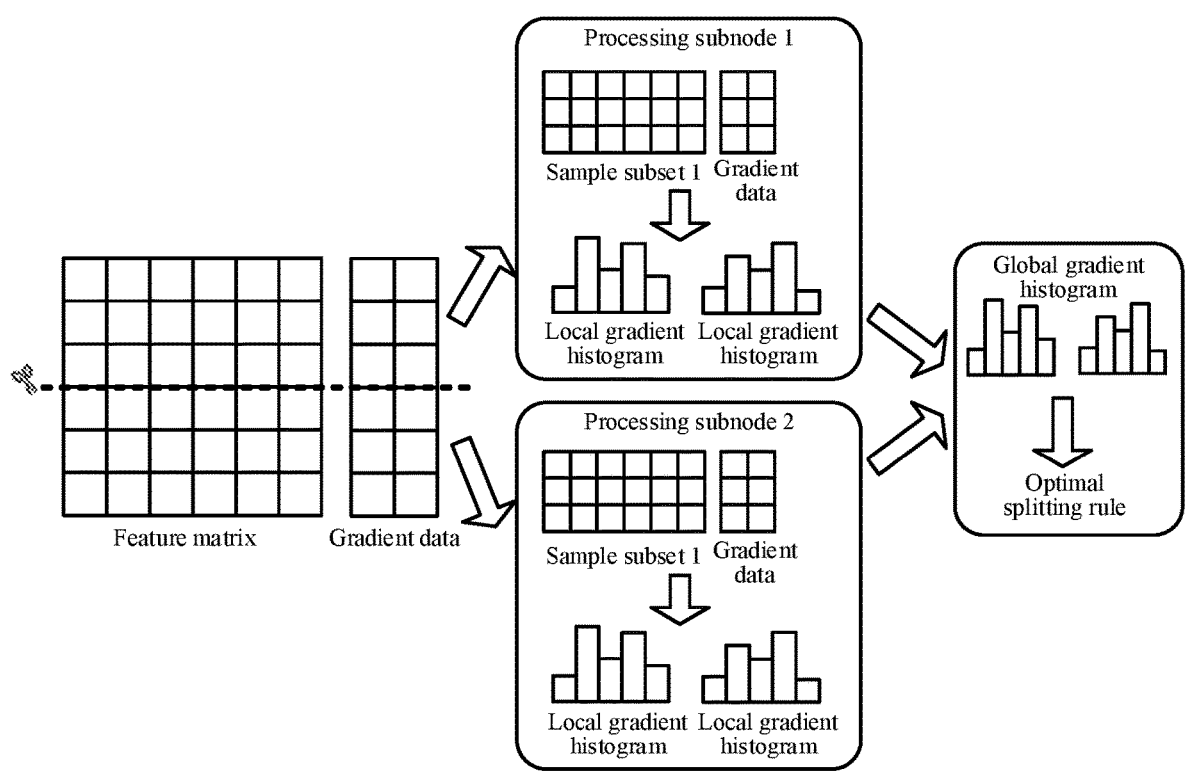
FIG. 1B is a diagram of using a distributed training system for training a decision tree model.

FIG. 1B is an example of using a distributed training system for training a decision tree model. It is assumed that parallel training is performed by using two processing subnodes. According to the row division mode shown in FIG. 1B, the feature matrix is divided into two feature sub-matrices $T_1$ and $T_2$, and the gradient data is also divided into two parts $G_1$ and $G_2$. $T_1$ and $G_1$ are transmitted to a processing subnode 1, and $T_2$ and $G_2$ are transmitted to a processing subnode 2. The processing subnode 1 obtains a local gradient histogram $H_{1,j}$ corresponding to each feature j according to $T_1$ and $G_1$ and transmits the local gradient histogram $H_{1,j}$ to the main processing node, and the processing subnode 2 obtains a local gradient histogram $H_{2,j}$ corresponding to each of the feature j according to $T_2$ and $G_2$ and transmits the local gradient histogram $H_{2,j}$ to the main processing node. The main processing node merges the local gradient histogram $H_{1,j}$ and the local gradient histogram $H_{2,j}$ of each of the feature j, to obtain a global gradient histogram Hj of each of the feature j, and determines an optimal splitting rule (an optimal splitting feature and an optimal splitting feature value) as the splitting rule of the currently processed tree node based on the global gradient histograms of all the features.

In some embodiments, the size of the gradient histogram is related to factors such as the height of the tree, the quantity of features, and the quantity of categories. A global gradient histogram needs to be established for each feature on each tree node of the decision tree, and the quantity of tree nodes grows quadratically with the height of the tree. Therefore, a higher decision tree indicates more global gradient histograms that need to be established, and a larger quantity of features indicates more local gradient histograms and global gradient histograms that need to be established. It is assumed that, a maximum height of the decision tree is L=10, the quantity of features is D=100000, the quantity of categories is C=10, and the quantity of candidate splitting feature values in a gradient histogram is q=20, a total size of the gradient histogram is $2 \times 2^{(L-2)} \times D \times C \times q \times 8 = 82$ GB, where the leaf nodes of the decision tree do not need to establish the corresponding gradient histograms, and therefore, the exponent is L−2. Therefore, when the height of the tree is relatively tall, the quantity of features is relatively large, and the quantity of categories is relatively large, the quantity of local gradient histograms generated by the processing subnodes is relatively large, and a finally generated global gradient histogram is very large. Consequently, a large amount of communication resource need to be consumed for transmitting the local gradient histograms, and a large amount of memory overhead needs to be consumed for storing the global gradient histogram.

Therefore, the feature matrix of the sample is divided into a plurality of feature subsets based on columns, where each feature subset includes a plurality of feature columns $T_j$, and the feature columns $T_j$ include feature values of features j of all samples. All feature subsets form the feature matrix of the decision tree model, and any two feature subsets do not intersect with each other. If parallel processing is performed by using N processing subnodes, the feature matrix of the sample is divided into N feature subsets based on columns, where each processing subnode corresponds to one feature subset, that is, respective feature subsets of the N processing subnodes form the feature matrix, and the feature subsets of the N processing subnodes do not intersect with each other. Sequentially, during training, the distributed training system determines a splitting rule corresponding to each tree node in the following manner until a stop condition is met: each processing subnode separately obtains, for a currently being trained tree node, a node training feature set and gradient data of the currently being trained tree node, the node training feature set being determined by a splitting rule of a previously trained tree node and a feature subset of the processing subnode; each processing subnode separately determines a local optimal splitting rule for the currently being trained tree node according to the node training feature set and the gradient data that are obtained, and transmits the local optimal splitting rule to the main processing node, the local optimal splitting rule including a feature and a feature value that maximize a gain of an objective function; and the main processing node selects a splitting rule corresponding to the currently being trained tree node from the local optimal splitting rule determined by each of the processing subnode. In this way, only the local optimal splitting rule needs to be transmitted between the processing subnode and the main processing node. Therefore, the network communication traffic is very small, and the main processing node does not need to store the global gradient histogram, thereby reducing memory overhead of the system.

After a design idea of the embodiments of this application is described, the following briefly describes application scenarios to which the technical solutions in the embodiments of this application can be applied. The application scenarios described below are merely used for describing rather than limiting the embodiments of this application. In one implementation, the technical solutions provided in the embodiments of this application may be flexibly applied according to an actual requirement.

Figure 2:
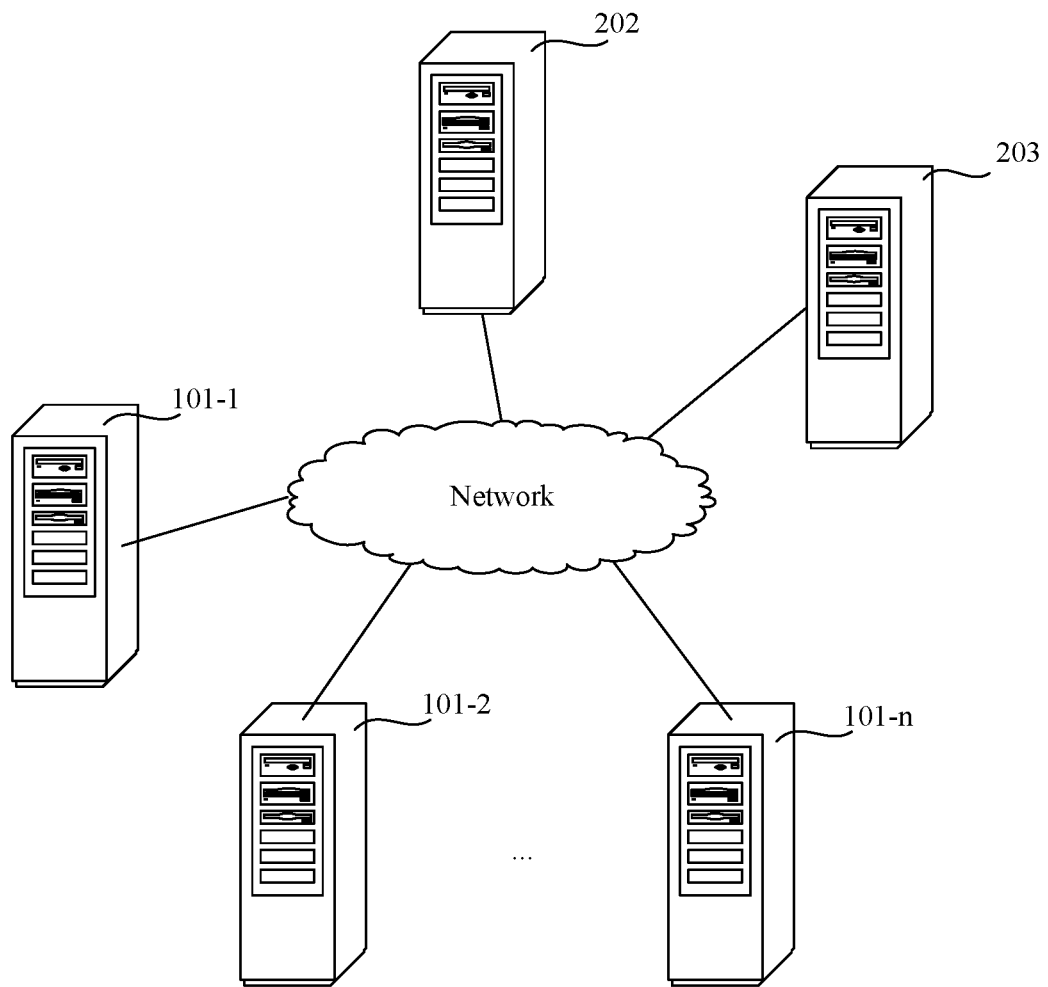
FIG. 2 is a schematic diagram of a distributed training system according to an embodiment of this application.

FIG. 2 is a schematic structural diagram of a distributed training system according to an embodiment of this application. The distributed training system includes a plurality of processing subnodes 201 (including a processing subnode 201-1, a processing subnode 201-2, . . . , and a processing subnode 201-n), a main processing node 202, and a data storage server 203. The processing subnode 201, the main processing node 202, and the data storage server 203 are connected to each other through a communication network, and any two devices may communicate with each other through the communication network. The processing subnode 201, the main processing node 202, and the data storage server 203 may each be a server, a server cluster formed by a plurality of servers, or a cloud computing center.

The data storage server 203 stores sample data for a plurality of training tasks, and the sample data has been pre-cleaned, pre-processed, and pre-labeled, and can be directly used for training. A user may alternatively submit, according to requirements of a specific training task, sample data meeting the requirements to the distributed training system, and the distributed training system stores the sample data submitted by the user in the data storage server 203, for the training task to use.

Figure 3:
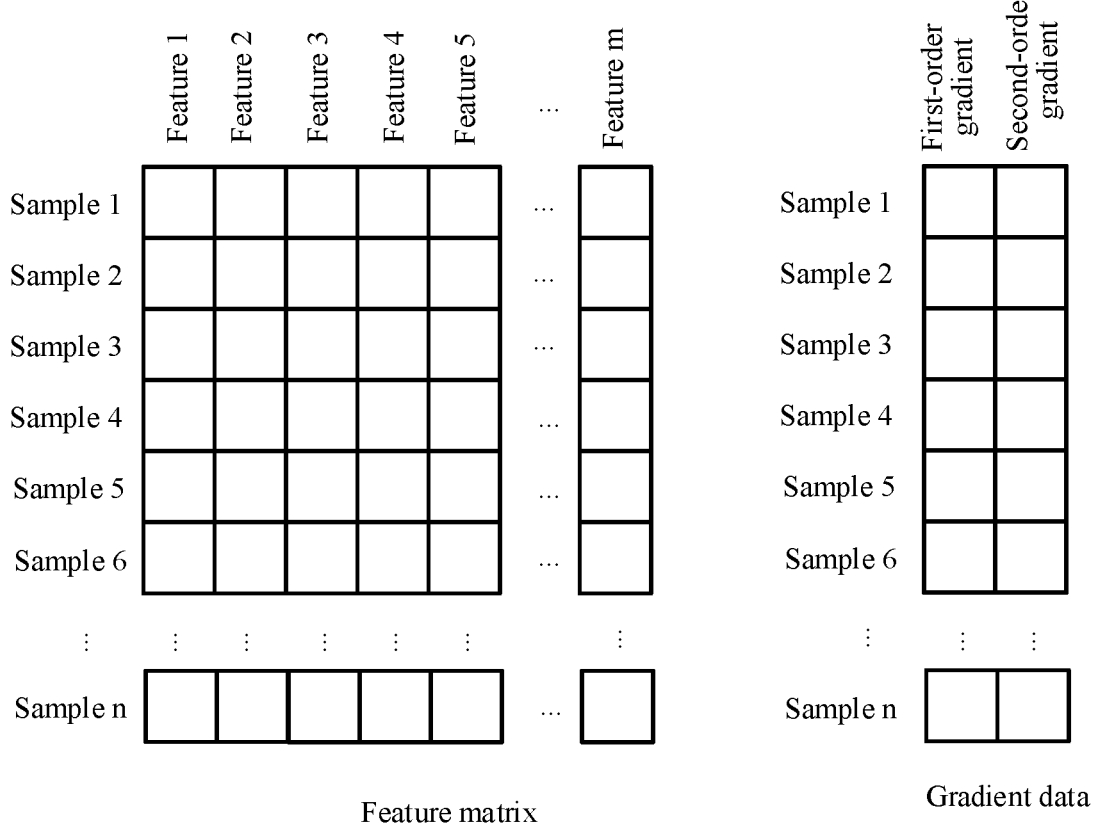
FIG. 3 is a schematic diagram of a storage format of sample data for training a decision tree model.

Referring to FIG. 3, the data storage server 203 may store sample data of any training task in a data matrix manner. The sample data of each training task includes two parts. One part is a feature matrix, used for storing the feature values of all the features of all the samples. The feature values corresponding to the feature j of the $i^{th}$ sample are stored in the $i^{th}$ row and the $j^{th}$ column in the feature matrix. That is, feature values of all features of one sample are stored in each row of the feature matrix, and feature values of the same feature of all samples are stored in each column. For ease of description, a column of data features in the feature matrix is referred to as a feature column. For example, the feature columns $T_j$ include feature values of features j of all the samples. The other part is gradient data. The gradient data includes a first-order gradient and a second-order gradient of each sample, and the gradient data may alternatively be stored in a matrix manner. Referred to FIG. 3, in a matrix corresponding to the gradient data, a first-order gradient of the $i^{th}$ sample is stored in the $i^{th}$ row and a first column, and a second-order gradient of the $i^{th}$ sample is stored in the $i^{th}$ row and a second column.

In this embodiment, the features in the feature matrix are attributes that are related to features of the training task in attributes of the sample itself, and need to be predetermined according to the specific training task. For example, if the training task is female commodity recommendation, features may be information such as an educational background, an income, a type of work, a height, a weight, and an age. In some embodiments, a large quantity of female purchase records may be obtained. One purchaser is used as a sample, information such as an educational background, an income, a type of work, a height, a weight, and an age of each purchaser is extracted from the obtained purchase records and is used as feature values, thereby constructing a feature matrix.

In this embodiment, the decision tree model includes at least one decision tree. When the decision tree model includes a plurality of decision trees, after a first decision tree is trained, a next decision tree is continuously trained unit all decision trees are trained. Then, all trained decision trees are integrated into a model as a training result.

In one implementation, each sample in the sample data is further labeled with an actual value corresponding to the sample. For example, in a classification task, the actual value is an actual category corresponding to the sample, and in a regression task, the actual value is an actual value corresponding to the sample. In the training process, after a decision tree is trained each time, gradient data (including a first-order gradient and a second-order gradient) of each sample may be calculated through a cost function according to an actual value of the sample and a predicted value given by the decision tree, to update original gradient data, and then, a next decision tree is trained based on a feature matrix and the updated gradient data.

In this embodiment, the functions of the main processing node 202 include, but not limited to, being used to control processing subnodes to perform the distributed training task, collect local optimal splitting rules determined by the processing subnodes 201, and determine a global optimal splitting rule. The functions of the processing subnode 201 include, but not limited to, reading sample data, assigning the sample data, establishing a gradient histogram, determining a local optimal splitting rule, and calculating a splitting result. Subsequently, in the training process, various functions of the main processing node 202 and the processing subnode 201 are described in detail.

The following describes the training process of the decision tree model with reference to the distributed training system shown in FIG. 2.

First, each processing subnode needs to obtain a feature subset corresponding to the processing subnode from the data storage server, where the feature subset is used for training the decision tree model. In some embodiments, the obtaining a feature subset may be implemented in any one of the following methods.

A first method is that a single node splits the feature matrix.

In some embodiments, the main processing node may obtain, from the data storage server, the feature matrix used for current training, and determine N processing subnodes participating in the training task, N being a positive integer greater than or equal to 2. Then, the main processing node divides the feature matrix into N feature subsets based on columns, each feature subset including a plurality of feature columns, all the feature subsets obtained through division forming the feature matrix, and any two feature subsets not intersecting with each other, and transmits the N feature subsets to the N processing subnodes, respectively. Each processing subnode obtains one feature subset.

In one implementation, the main processing node may determine the quantity N of processing subnodes according to the quantity I of features (that is, the quantity of columns) included in the feature matrix and the quantity of data processed by the processing subnodes. For example, if the processing subnodes may process M feature columns at most, I/M is calculated. If I/M is an integer, N=I/M, and if I/M is not an integer, N=(rounded-down number of I/M)+1.

In one implementation, the main processing node may alternatively control any processing subnode to divide the feature matrix into N feature subsets, and transmit the feature subsets to the corresponding processing subnodes, respectively.

A second method is that the feature matrix is split in a distributed method.

Figure 4:
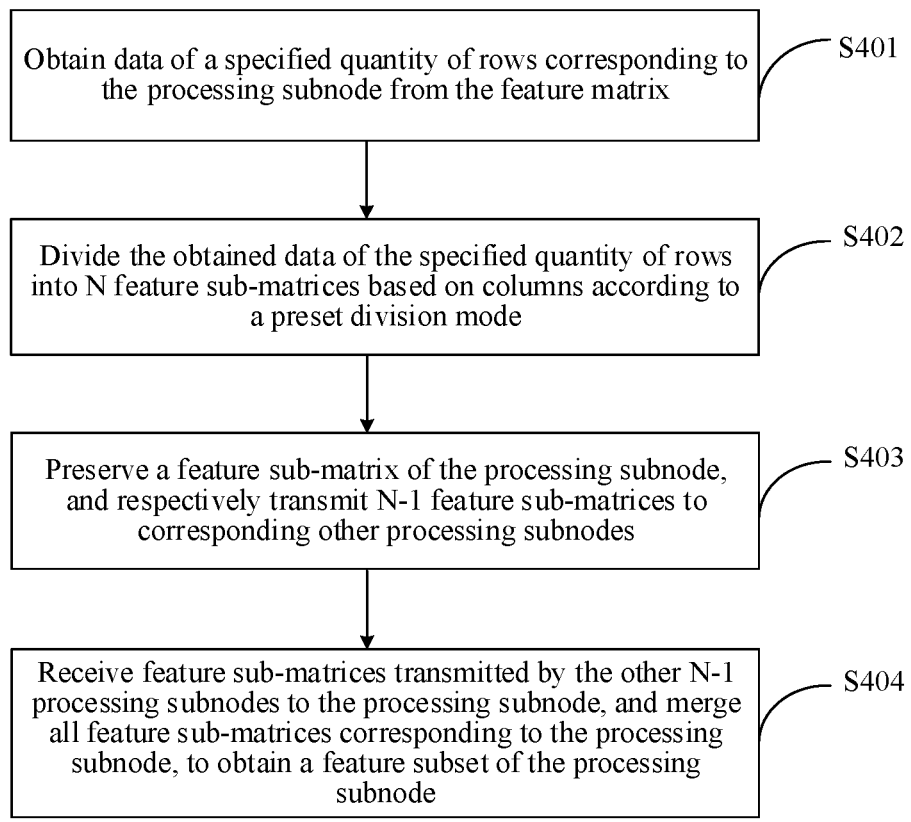
FIG. 4 is a schematic flowchart of each processing subnode obtaining a feature subset of the processing subnode according to an embodiment of this application.

In some embodiments, referring to FIG. 4, each processing subnode separately obtains a feature subset of the processing subnode in the following method.

S401. Obtain data of a specified quantity of rows corresponding to the processing subnode from the feature matrix.

In this embodiment, for ease of description, a set of data of the specified quantity of rows corresponding to the processing subnode that is obtained by the processing subnode from the feature matrix may be referred to as a sample subset. The sample subset is also stored according to the format of the data matrix, and reference is made to the format of the feature matrix. Details are not described again.

In one implementation, each processing subnode pre-stores a uniform data division policy. The data division policy defines the specified quantity of rows corresponding to each processing subnode, and the specified quantity of rows corresponding to each of the processing subnode is not repeated. In addition, the specified quantity of rows of all the processing subnodes covers all the quantity of rows of the feature matrix, to ensure that each processing subnode obtains non-repeated samples from the feature matrix, and data of each row of the feature matrix is obtained by one processing subnode.

In one implementation, the specified quantity of rows corresponding to each processing subnode may be determined according to the quantity of rows of the feature matrix and the quantity of processing subnodes. For example, if the quantity of rows of the feature matrix is 98, and the quantity of processing subnodes is 10, it may be specified that the specified quantity of rows of the processing subnode 201-1 is 1-10, the specified quantity of rows of the processing subnode 201-2 is 11-20, . . . , the specified quantity of rows of the processing subnode 201-9 is 81-90, and the specified quantity of rows of the processing subnode 201-10 is 91-98.

In another implementation, the specified quantity of rows corresponding to each processing subnode may be determined according to the following method: The quantity of processing subnodes is N, and each processing subnode calculates a remainder obtained by dividing each quantity I of rows in the feature matrix by N; the processing subnode 201-N determines the quantity of rows with a remainder N−1 as the specified quantity of rows, that is, obtains data of the quantity of rows with the remainder N−1 in the feature matrix, to obtain a sample subset of the processing subnode 201-N; the processing subnode 201-N−1 determines the quantity of rows with a remainder N−2 in the feature matrix as the corresponding specified quantity of rows, to obtain a sample subset of the processing subnode 201-N−1; . . . ; the processing subnode 201-2 determines the quantity of rows with a remainder 1 in the feature matrix as the corresponding specified quantity of rows, to obtain a sample subset of the processing subnode 201-2; and the processing subnode 201-1 determines the quantity of rows with a remainder 0 in the feature matrix as the corresponding specified quantity of rows, to obtain a sample subset of the processing subnode 201-1. In this way, when the quantity of rows of the feature matrix is relatively large, the specified quantity of rows corresponding to each of the processing subnode may be quickly determined, and it is ensured that the specified quantity of rows is not repeated.

For example, if the total quantity of rows of the feature matrix is 98, and the quantity of processing subnodes is N=10, the processing subnode 201-1 obtains data of the quantity of rows with the remainder 0 in the feature matrix, that is, data of rows 10, 20, 30, . . . and 90, to obtain the sample subset of the processing subnode 201-1; the processing subnode 201-2 obtains data of the quantity of rows with the remainder 1 in the feature matrix, that is, data of rows 1, 11, 21, 31, . . . and 91, to obtain the sample subset of the processing subnode 201-2; . . . ; and the processing subnode 201-10 obtains data of the quantity of rows with the remainder 9 in the feature matrix, that is, data of rows 9, 19, 29, . . . and 89, to obtain the sample subset of the processing subnode 201-10.

Certainly, each processing subnode may alternatively obtain data of the specified quantity of rows in another manner, provided that the quantity of rows obtained by each processing subnode is not repeated, and data of any row in the feature matrix is obtained by one processing subnode.

In one implementation, the data division policy may be determined by the main processing node, and is transmitted to each of the processing subnode.

S402. Divide the obtained data of the specified quantity of rows into N feature sub-matrices based on columns according to a preset division mode.

In one implementation, the data division policy in each processing subnode further includes a division mode, and feature columns included in each feature sub-matrix and the processing subnode corresponding to each of the feature sub-matrix may be determined by using the division mode.

In one implementation, the division mode may be determined according to the total quantity of columns of the feature matrix and the quantity N of processing subnodes. For example, if the total quantity of columns of the feature matrix is 98, and the quantity N of processing subnodes is N=10, the division mode may be as follows: Each processing subnode divides the sample subset into feature sub-matrices, each of which includes data of each 10 columns. That is, a first feature sub-matrix includes the first to $10^{th}$ feature columns in the sample subset, and a second feature sub-matrix includes the $11^{th}$ to $20^{th}$ feature columns in the sample subset. By analogy, a tenth feature sub-matrix includes the $91^{st}$ to $98^{th}$ feature columns in the sample subset. In addition, it is specified that the first feature sub-matrix obtained by each of the processing subnode through division is transmitted to the processing subnode 201-1, and the second feature sub-matrix obtained by each of the processing subnode through division is transmitted to the processing subnode 201-2. By analogy, the tenth feature sub-matrix obtained by each processing subnode through division is transmitted to the processing subnode 201-10.

In another implementation, each processing subnode may divide the obtained sample subset into N feature sub-matrices based on columns by using the following division mode. The quantity of processing subnodes is N, and a remainder obtained by dividing each quantity J of columns in the feature matrix by N is calculated. The feature columns with the remainder 0 are assigned to the first feature sub-matrix and are transmitted to the processing subnode 201-1, and the feature columns with the remainder 1 are assigned to the second feature sub-matrix and are transmitted to the processing subnode 201-2. By analogy, the feature columns with the remainder N−1 are assigned to the $N^{th}$ feature sub-matrix and are transmitted to the processing subnode 201-N. In this way, when the quantity of rows of the feature matrix is relatively large, the sample subset may be quickly divided.

For example, if the quantity of columns of the sample subset is 98, and the quantity of processing subnodes is 10, the feature columns with the remainder 0 in the sample subset, that is, columns 10, 20, 30, . . . , and 90, are assigned to the first feature sub-matrix and are transmitted to the processing subnode 201-1; the feature columns with the remainder 1 in the sample subset, that is, columns 1, 11, 21, 31, . . . , and 91, are assigned to the second feature sub-matrix and are transmitted to the processing subnode 201-2. By analogy, the feature columns with the remainder 9 in the sample subset, that is, columns 9, 19, 29, . . . , and 89, are assigned to the tenth feature sub-matrix and are transmitted to the processing subnode 201-10.

Certainly, the processing subnode may alternatively divide the sample subset into N feature sub-matrices in another manner, but it needs to be ensured that the division mode used by each processing subnode is completely the same.

S403. Preserve a feature sub-matrix of the processing subnode, and respectively transmit N−1 feature sub-matrices to corresponding other processing subnodes.

S404. Receive feature sub-matrices transmitted by the other N−1 processing subnodes to the processing subnode, and merge all feature sub-matrices corresponding to the processing subnode, to obtain the feature subset of the processing subnode.

Figure 5:
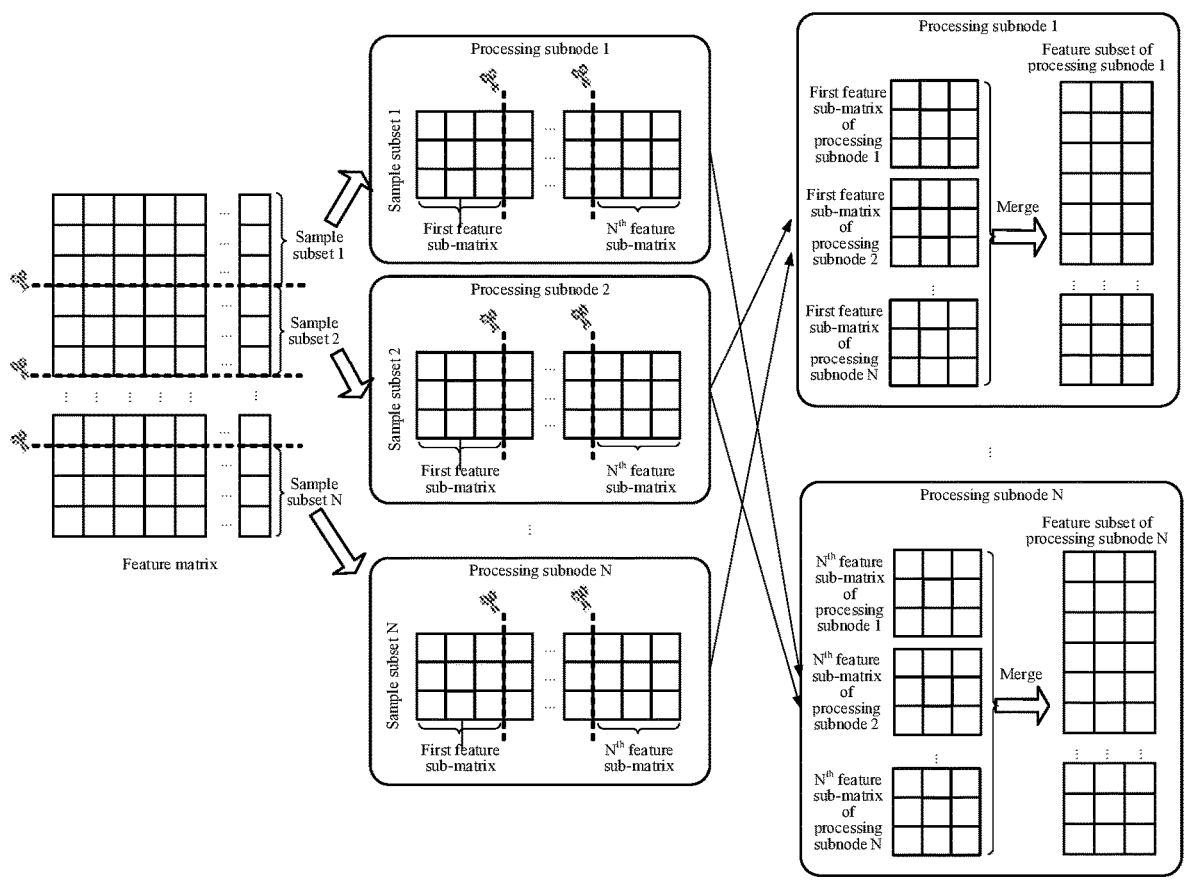
FIG. 5 is a schematic diagram of dividing a feature matrix using a distributed training system according to an embodiment of this application.

The processing subnode 201-1 is used as an example. After receiving the first feature sub-matrices transmitted by the other processing subnodes to the processing subnode 201-1, the processing subnode 201-1 aligns the columns of all the first feature sub-matrices (including the first feature sub-matrix determined by the processing subnode 201-1 and the first feature sub-matrices transmitted by the other N−1 processing subnodes to the processing subnode 201-1) according to the manner shown in FIG. 5, and merges all the first feature sub-matrices into one feature subset. All the processing subnodes may use the mode shown in FIG. 5 to obtain respective corresponding feature subsets.

In addition, all the processing subnodes further need to obtain the gradient data corresponding to the feature matrices from the data storage server. After obtaining the respective corresponding feature subsets and the complete gradient data, all the processing subnodes may start to train the decision tree model.

In some embodiments, one decision tree model generally includes a plurality of decision trees, and training processes of the decision trees are similar. Therefore, only the training process of one decision tree is used as an example for description in this application.

In one implementation, tree nodes are continually split downward starting from the root node. Each tree node is split into two child nodes, and a splitting rule corresponding to each of the tree node is sequentially determined.

Figure 6:
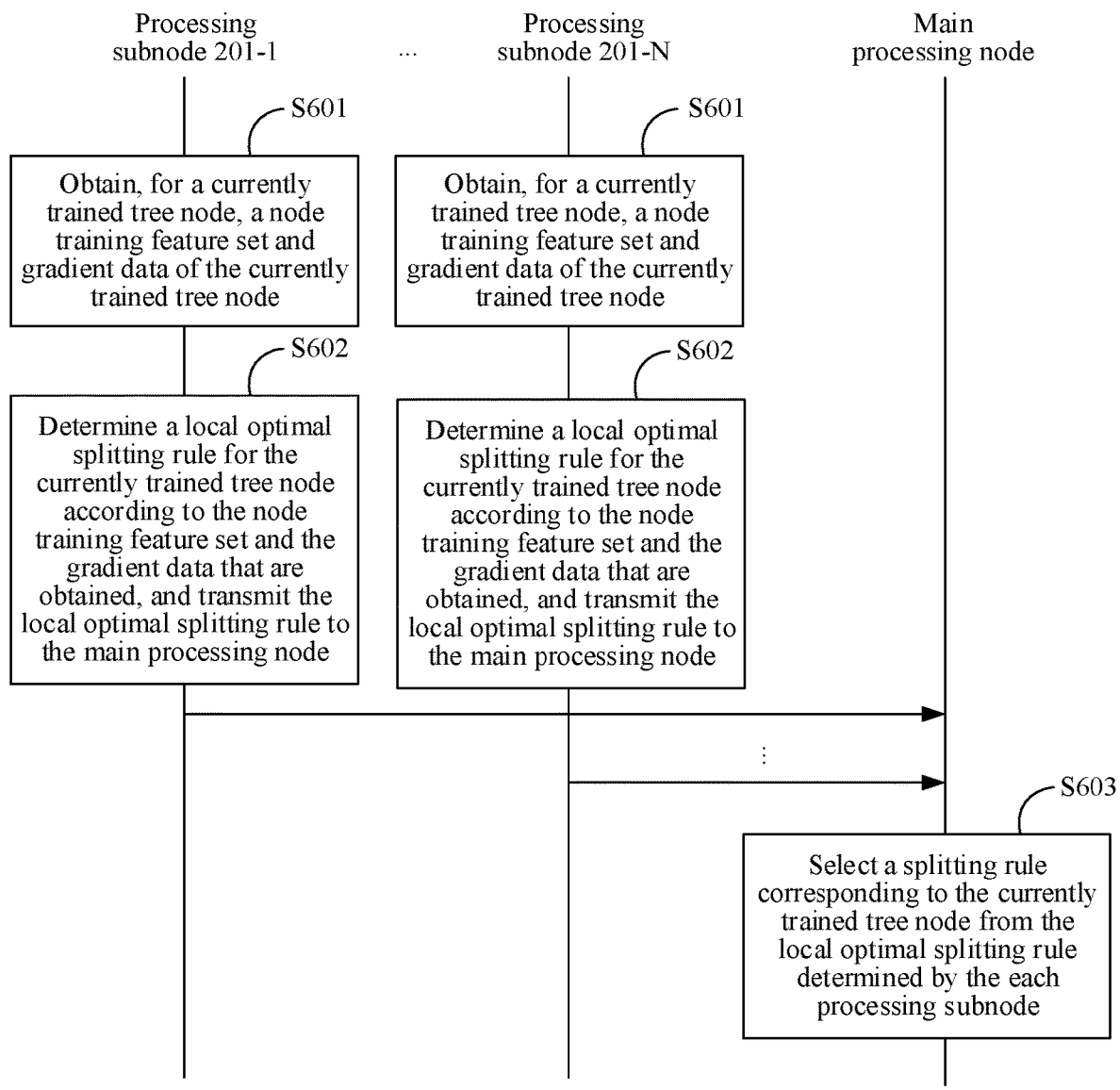
FIG. 6 is a schematic flowchart of a training method for a decision tree model according to an embodiment of this application.

The following first uses training of one tree node in the decision tree as an example, to describe the training method for a decision tree model. Referring to FIG. 6, a training method for a decision tree model is provided in an embodiment of this application, and includes the following steps:

S601. Each processing subnode separately obtains, for a currently being trained tree node, a node training feature set and gradient data of the currently being trained tree node, the gradient data being gradient data of a feature matrix of the decision tree model, and the node training feature set being determined by a splitting rule of a previously trained tree node and a feature subset of the processing subnode. In an example, the processing subnode may be an electronic device.

Figure 7A:
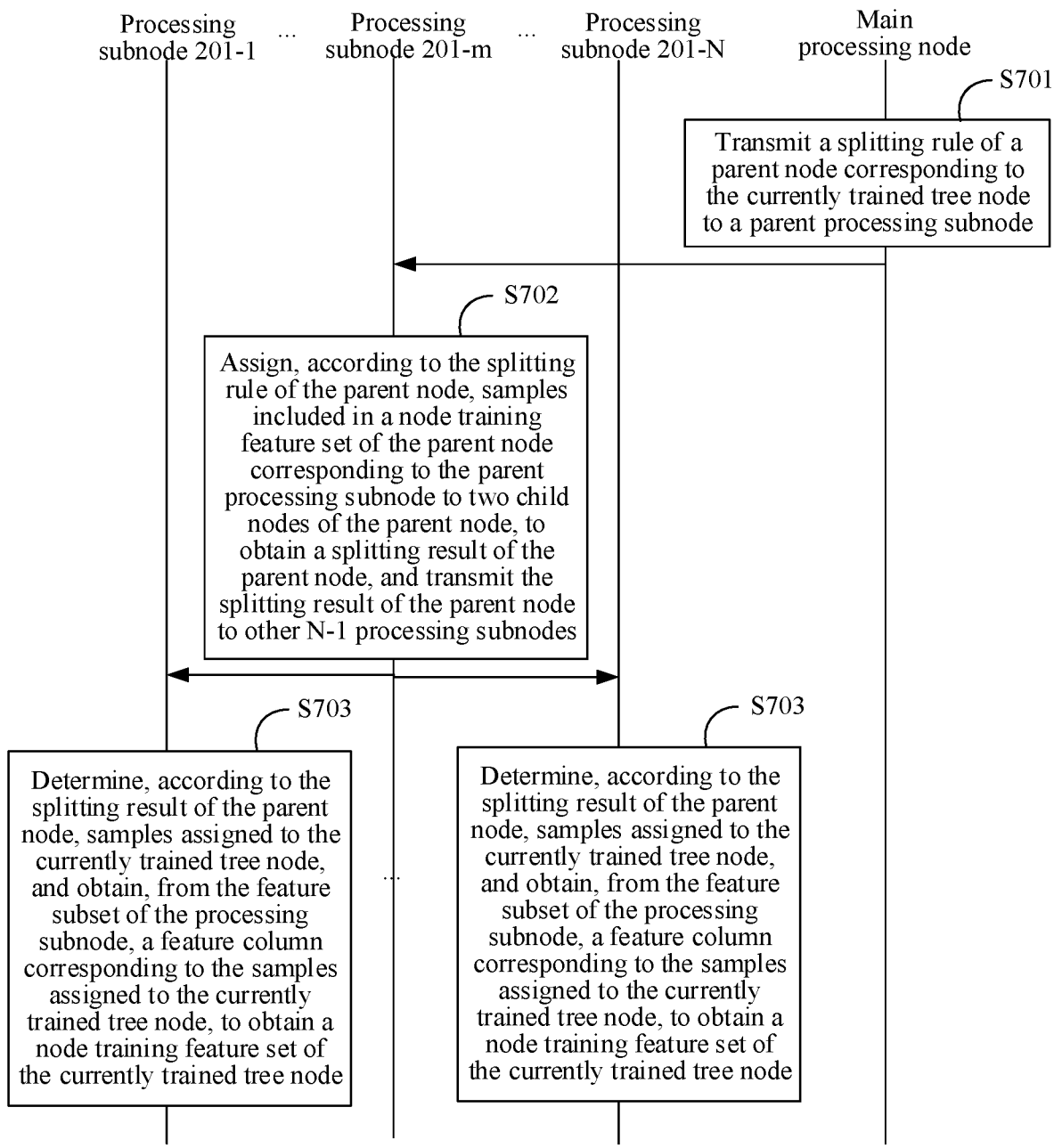
FIG. 7A is a schematic flowchart of determining a node training feature set of a currently being trained tree node for each processing subnode according to an embodiment of this application.

Referring to FIG. 7A, in one implementation, the node training feature set of the currently being trained tree node of each of the processing subnode may be determined in the following manner:

S701. The main processing node transmits a splitting rule of a parent node corresponding to the currently being trained tree node to a parent processing subnode, the parent processing subnode being a processing subnode corresponding to features in the splitting rule of the parent node. In an example, the main processing node may be an electronic device.

For example, if the features in the splitting rule of the parent node in step S701 are stored in a processing subnode 201-$m$, a parent processing subnode herein is the processing subnode 201-$m$.

S702. The parent processing subnode assigns, according to the splitting rule of the parent node, samples included in a node training feature set of the parent node corresponding to the parent processing subnode to two child nodes of the parent node, to obtain a splitting result of the parent node, and transmits the splitting result of the parent node to other N−1 processing subnodes.

The two child nodes of the parent node are referred to as a left child node and a right child node, respectively.

Because one processing subnode only stores a part of features, that is, the features corresponding to the splitting rule of the tree node only exist in one processing subnode, that is, only the processing subnode (that is, the parent processing subnode) that stores the features corresponding to the splitting rule may determine the splitting result, the main processing node needs to transmit the splitting rule of the tree node to the parent processing subnode, determines the splitting result corresponding to the splitting rule by using the parent processing subnode, and splits the tree node into the left child node and the right child node.

In one implementation, if the splitting rule of the parent node in step S701 includes the feature j and a feature value $s_{j,k}$, the feature column $T_j$ in the node training feature set of the parent node on the parent processing subnode is obtained, and samples whose feature values are less than $s_{j,k}$ in the feature column $T_j$ are assigned to the left child node of the parent node, and samples whose feature values are not less than $s_{j,k}$ in the feature column $T_j$ are assigned to the right child node of the parent node, to obtain the splitting result of the parent node.

In this embodiment, because the feature matrix is divided based on columns, and the transmission communication traffic of the splitting result is only related to the quantity of samples, the training method for a decision tree model provided in this embodiment may train a deeper decision tree on the premise that data has the same communication traffic.

S703. Each of the other processing subnodes separately determines, according to the splitting result of the parent node, samples assigned to the currently being trained tree node, and obtains, from the feature subset of the processing subnode, a feature column corresponding to the samples assigned to the currently being trained tree node, to obtain the node training feature set of the currently being trained tree node.

Figure 7B:
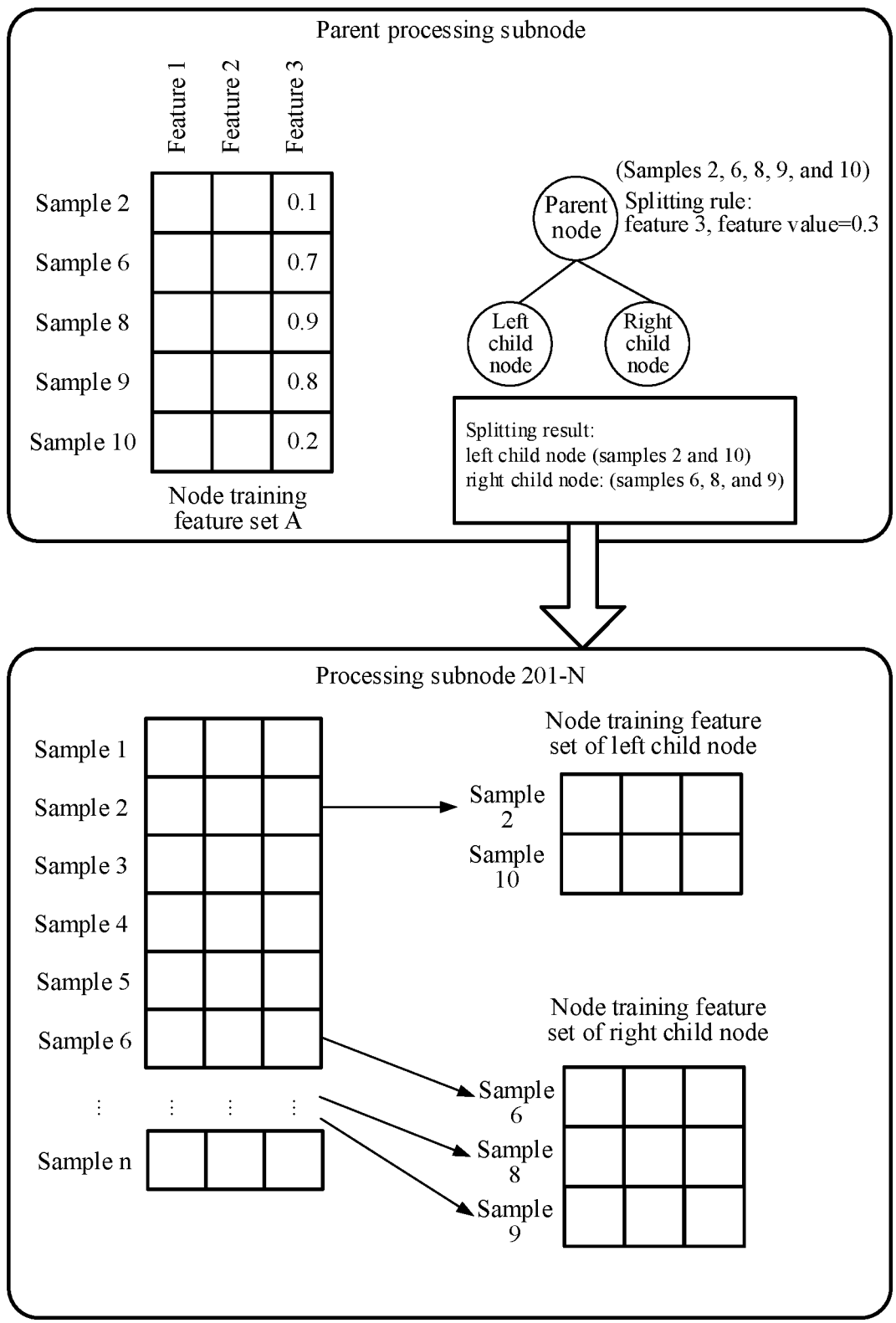
FIG. 7B is a schematic diagram of determining a node training feature set of a currently being trained tree node of each processing subnode according to an embodiment of this application.

Referring to FIG. 7B, if the splitting rule of the parent node in step S701 includes a feature 3 and a feature value 0.3, samples 2 and 10 whose feature values of the feature 3 are less than 0.3 in a node training feature set A of the parent node on the parent processing subnode are assigned to the left child node of the parent node, samples 6, 8 and 9 whose feature values of the feature 3 in the node training feature set A are not less than 0.3 are assigned to the right child node of the parent node, and the splitting result is transmitted to other processing subnodes.

A processing subnode 201-N is used as an example. If the currently being trained tree node is the left child node of the parent node in step S701, and the feature subset of the processing subnode is shown in FIG. 7B, data of the second row and the $10^{th}$ row in the feature subset is used as the node training feature set of the left child node of the parent node according to the splitting result of the parent node; and if the currently being trained tree node is the right child node of the parent node in step S701, data of rows 6, 8 and 9 in the feature subset is used as the node training feature set of the right child node of the parent node. Similarly, the parent processing subnode also assigns data of each row in the node training feature set of the parent node corresponding to the parent processing subnode to the left child node and the right child node of the parent node according to the splitting result of the parent node, to obtain node training feature sets corresponding to the left child node and the right child node, respectively.

In one implementation, in step S601, if the currently being trained tree node is the left child node of the parent node of the currently being trained tree node, the node training feature set of the left child node of the parent node of the currently being trained tree node is obtained; and if the currently being trained tree node is the right child node of the parent node of the currently being trained tree node, the node training feature set of the right child node of the parent node of the currently being trained tree node is obtained.

If the splitting results are transmitted in integers, communication overheads are relatively large, especially when the quantity of samples is relatively large. Considering that there are only two possibilities of the splitting results (the left child node and the right child node), for ease of transmitting the splitting results, compression coding may be performed on the splitting result of the parent node in a binary coding manner, and therefore the splitting result may be represented as (0, 1, 1, 1, 0,), where an $i^{th}$ digit of "0" indicates that a sample corresponding to the $i^{th}$ row in the node training feature set of the parent node is on the left child node of the parent node, and an $i^{th}$ digit of "1" indicates that a sample corresponding to the $i^{th}$ row in the node training feature set of the parent node is on the right child node of the parent node. In the foregoing example, the first "0" indicates that a sample corresponding to a first row in the node training feature set of the parent node is on the left child node of the parent node, the second "1" indicates that a sample corresponding to a second row in the node training feature set of the parent node is on the right child node of the parent node, and so on.

The sample corresponding to the $i^{th}$ row in the node training feature set is not necessarily a sample i. This is because, in each processing subnode, the node training feature set corresponding to the tree node (other than the root node) includes only data of some rows in the feature subset. For the same tree node, samples corresponding to rows of the node training feature sets in all the processing subnodes are completely the same, but respective columns are different. For example, if a node training feature set of the tree node A in the processing subnode 201-1 includes data of three rows, the first row corresponds to a sample 6, the second row corresponds to a sample 8, and the third row corresponds to a sample 9, each node training feature set of the tree node A in the other processing subnodes also includes data of three rows, each first row of the node training feature set corresponds to the sample 6, each second row corresponds to the sample 8, and each third row corresponds to the sample 9. In this way, it can be ensured that after all the processing subnodes obtain the splitting results of the binary coding, the samples assigned to the left child node and the right child node can be accurately determined.

In some embodiments, the processing subnode determines, based on the splitting results of the binary coding and the node training feature set (or the samples assigned to the parent node) corresponding to the parent node of the currently being trained tree node, samples assigned to the currently being trained tree node, and obtains, from the feature subset of the processing subnode (or the node training feature set corresponding to the parent node), a feature column corresponding to the samples assigned to the currently being trained tree node, to obtain the node training feature set of the currently being trained tree node.

By transmitting the splitting results in the foregoing binary coding manner, the size of the transmitted splitting results can be reduced, thereby reducing network transmission overheads. For example, when there are 100 million pieces of sample data, the size of the transmitted splitting results is about 10 MB.

S602. Each processing subnode separately determines a local optimal splitting rule for the currently being trained tree node according to the node training feature set and the gradient data that are obtained, and transmits the local optimal splitting rule to the main processing node, the local optimal splitting rule including a feature and a feature value that maximize a gain of an objective function.

In one implementation, each processing subnode uses the features in the feature subset corresponding to the processing subnode as candidate features, and specifies a plurality of candidate feature values for each candidate feature.

In one implementation, each processing subnode may determine a local optimal splitting rule in the following manners: using the candidate feature value $s_{j,k}$ of the candidate feature j as a splitting point for each candidate feature value corresponding to each candidate feature selected by the processing subnode, assigning a sample whose feature value of the feature j in the obtained node training feature set is less than the feature value $s_{j,k}$ to a left set, assigning a sample whose feature value of the feature j is not less than the feature value $s_{j,k}$ to a right set, and determining a gain of an objective function from the candidate feature value $s_{j,k}$ according to a sum of gradient data of all samples in the left set and a sum of gradient data of all samples in the right set; and determining, after the gain of the objective function from each candidate feature value corresponding to each candidate feature is obtained, a feature and a candidate feature value that maximize the gain of the objective function as the local optimal splitting rule of the currently being trained tree node.

In one implementation, the gain of the objective function from the candidate feature value $s_{j,k}$ may be calculated by using the following formula:

$$\text{Gain} = \frac{1}{2}\left[\frac{\left(\sum_{i\in I_L} g_i\right)^2}{\sum_{i\in I_L} h_i + \lambda} + \frac{\left(\sum_{i\in I_R} g_i\right)^2}{\sum_{i\in I_R} h_i + \lambda} - \frac{\left(\sum_{i\in I} g_i\right)^2}{\sum_{i\in I} h_i + \lambda}\right] - \gamma,$$

$I_L$ represents the left set, $I_R$ represents the right set, I is a union of $I_L$ and $I_R$, $g_i$ is the first-order gradient of the sample, and $h_i$ is the second-order gradient of the sample.

In one implementation, each processing subnode may separately count a gradient histogram corresponding to each feature. For each candidate feature value, the sum of the gradient data of all the samples falling into the left set and the sum of the gradient data of all the samples falling into the right set may be quickly determined based on the gradient histogram.

Figure 8:
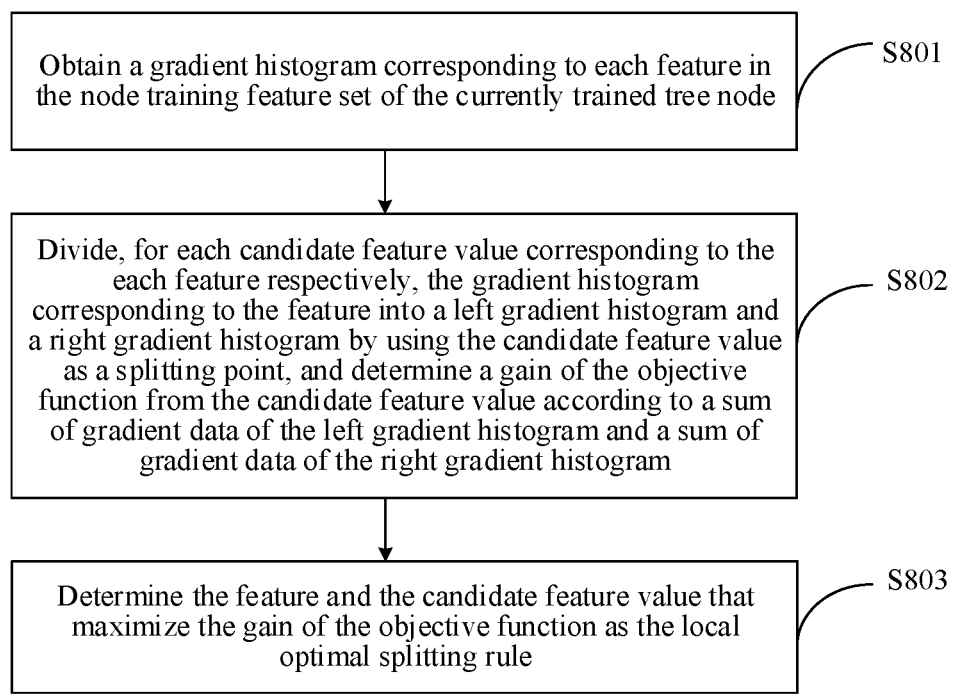
FIG. 8 is a schematic flowchart in which each processing subnode determines a local optimal splitting rule according to an embodiment of this application.

In another implementation, as shown in FIG. 8, each processing subnode may determine a local optimal splitting rule in the following manners:

S801. Obtain a gradient histogram corresponding to each feature in the node training feature set of the currently being trained tree node.

A horizontal axis of the gradient histogram is a candidate feature value, and a vertical axis of the gradient histogram is a sum of gradient data of samples with feature values between two adjacent candidate feature values.

In one implementation, the gradient histogram corresponding to each feature may be obtained by counting the data in the node training feature set with reference to the manner in FIG. 1A.

In another implementation, a gradient histogram corresponding to each feature in the node training feature set of the currently being trained tree node may be further obtained in the following manner: obtaining a gradient histogram corresponding to each feature of a parent node of the currently being trained tree node and a gradient histogram corresponding to each feature of another child node of the parent node; and determining, for each feature respectively, a difference between the gradient histogram of the feature of the parent node and the gradient histogram of the feature of the another child node as the gradient histogram corresponding to each feature in the node training feature set of the currently being trained tree node.

On the premise that the gradient histogram of another child node of the parent node of the currently being trained tree node is obtained, the gradient histogram of the currently being trained tree node may be obtained by using the gradient histogram reduction method. In this way, the calculation overheads of establishing histograms can be reduced.

S802. Divide, for each candidate feature value corresponding to each of the feature respectively, the gradient histogram corresponding to the feature into a left gradient histogram and a right gradient histogram by using the candidate feature value as a splitting point, and determine a gain of the objective function from the candidate feature value according to a sum of gradient data of the left gradient histogram and a sum of gradient data of the right gradient histogram.

For a specific calculation manner, refer to the gain formula of the objective function.

S803. Determine the feature and the candidate feature value that maximize the gain of the objective function as the local optimal splitting rule.

S603. The main processing node selects a splitting rule corresponding to the currently being trained tree node from the local optimal splitting rule determined by each processing subnode.

In one implementation, the processing subnodes may simultaneously transmit the gains corresponding to the respective determined local optimal splitting rules to the main processing node, and the main processing node selects a local optimal splitting rule with the maximum gain as the splitting rule corresponding to the currently being trained tree node from the local optimal splitting rule determined by each processing subnode.

In the training method for a decision tree model provided in this embodiment, the feature value of the sample is read based on columns, that is, the feature matrix is divided according to features, so that the feature subset in each processing subnode includes the feature values of all the samples corresponding to a plurality of features. Therefore, each processing subnode may determine the local optimal splitting rule based on the feature subset obtained by the processing subnode and transmit the local optimal splitting rule to the main processing node. Because the local optimal splitting rule includes only one determined feature and one determined feature value, the quantity of data transmitted by the processing subnode to the main processing node is very small, thereby reducing the communication overheads of the system. In addition, the processing subnodes does not need to store the global gradient histogram. Each processing subnode stores only a part (that is, a feature subset) in the feature matrix, and the feature subsets stored on the processing subnodes do not intersect with each other, thereby greatly reducing the memory overheads of the system.

The following uses an example in which one decision tree is trained, to describe the training method for a decision tree model.

Figure 9A:
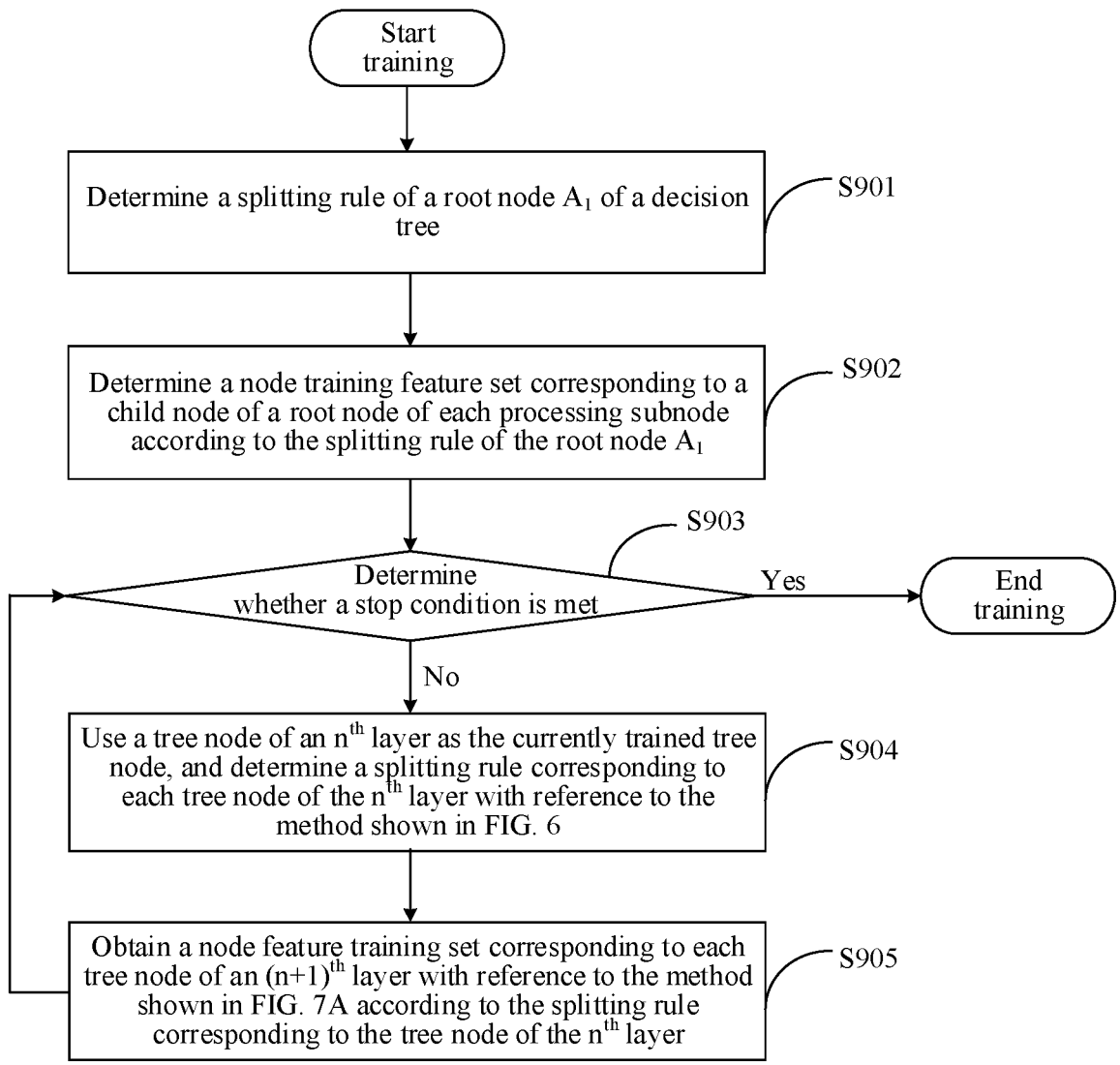
FIG. 9A is a schematic flowchart of a training method for a decision tree model according to an embodiment of this application.
Figure 12:
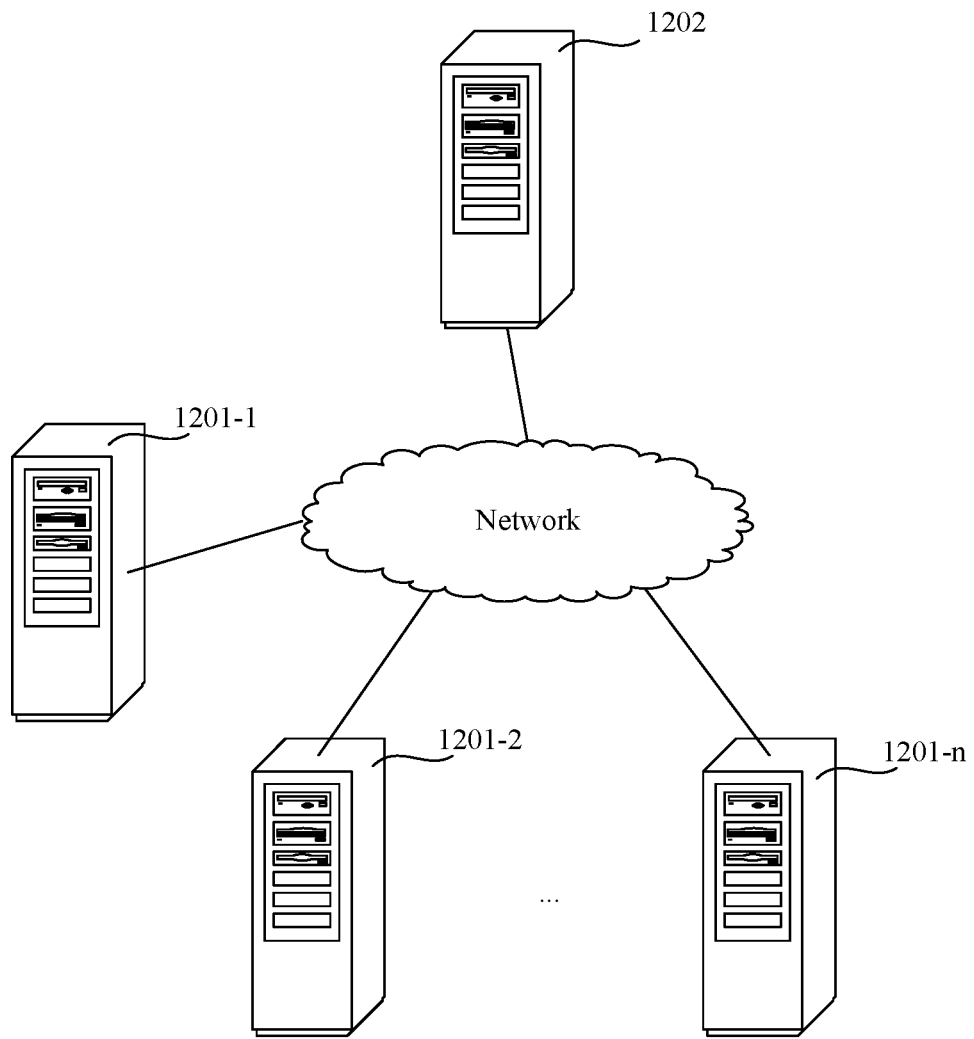
FIG. 12 is a schematic structural diagram of a training system for a decision tree model according to an embodiment of this application.

Referring to FIG. 9A, a training method for a decision tree model provided in an embodiment of this application may be performed by the training system for a decision tree model shown in FIG. 12. The training system for a decision tree model includes N processing subnodes and a main processing node, N being a positive integer greater than or equal to 2. The training method includes the following steps:

S901. Determine a splitting rule of a root node $A_1$ of a decision tree.

S902. Determine a node training feature set corresponding to a child node of a root node of each processing subnode according to the splitting rule of the root node $A_1$.

Figure 9B:
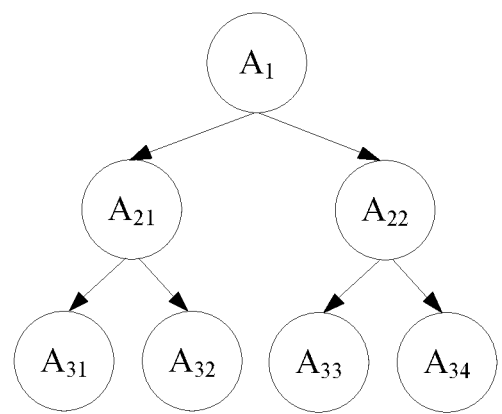
FIG. 9B is an a decision tree model according to an embodiment of this application.

Referring to FIG. 9B, in step S902, samples of the root node may be split on two child nodes (a left child node $A_{21}$ and a right child node $A_{22}$) of the root node, and the process is the process of splitting the root node, to obtain tree nodes $A_{21}$ and $A_{22}$ of the second layer of the decision tree.

S903. Determine whether a stop condition is met. If the stop condition is met, training is stopped; otherwise, a value of n is added by 1, and S904 is performed.

An initial value of n is 1.

In one implementation, the stop condition includes, but not limited to, the decision tree reaching a preset maximum depth, and the tree nodes of the decision tree reaching a preset maximum node quantity.

S904. Use a tree node of an $n^{th}$ layer as the currently being trained tree node, and determine a splitting rule corresponding to each tree node of the $n^{th}$ layer with reference to the method shown in FIG. 6.

S905. Obtain a node feature training set corresponding to each tree node of an $(n+1)^{th}$ layer with reference to the method shown in FIG. 7A according to the splitting rule corresponding to the tree node of the $n^{th}$ layer, and return to S903.

Referring to FIG. 9B, $A_{21}$ is split into two tree nodes $A_{31}$ and $A_{32}$ according to a splitting rule corresponding to $A_{11}$, $A_{22}$ is split into two tree nodes $A_{33}$ and $A_{34}$ according to a splitting rule corresponding to $A_{22}$, and $A_{31}$, $A_{32}$, $A_{33}$ and $A_{34}$ are split tree nodes of a third layer.

Figure 10:
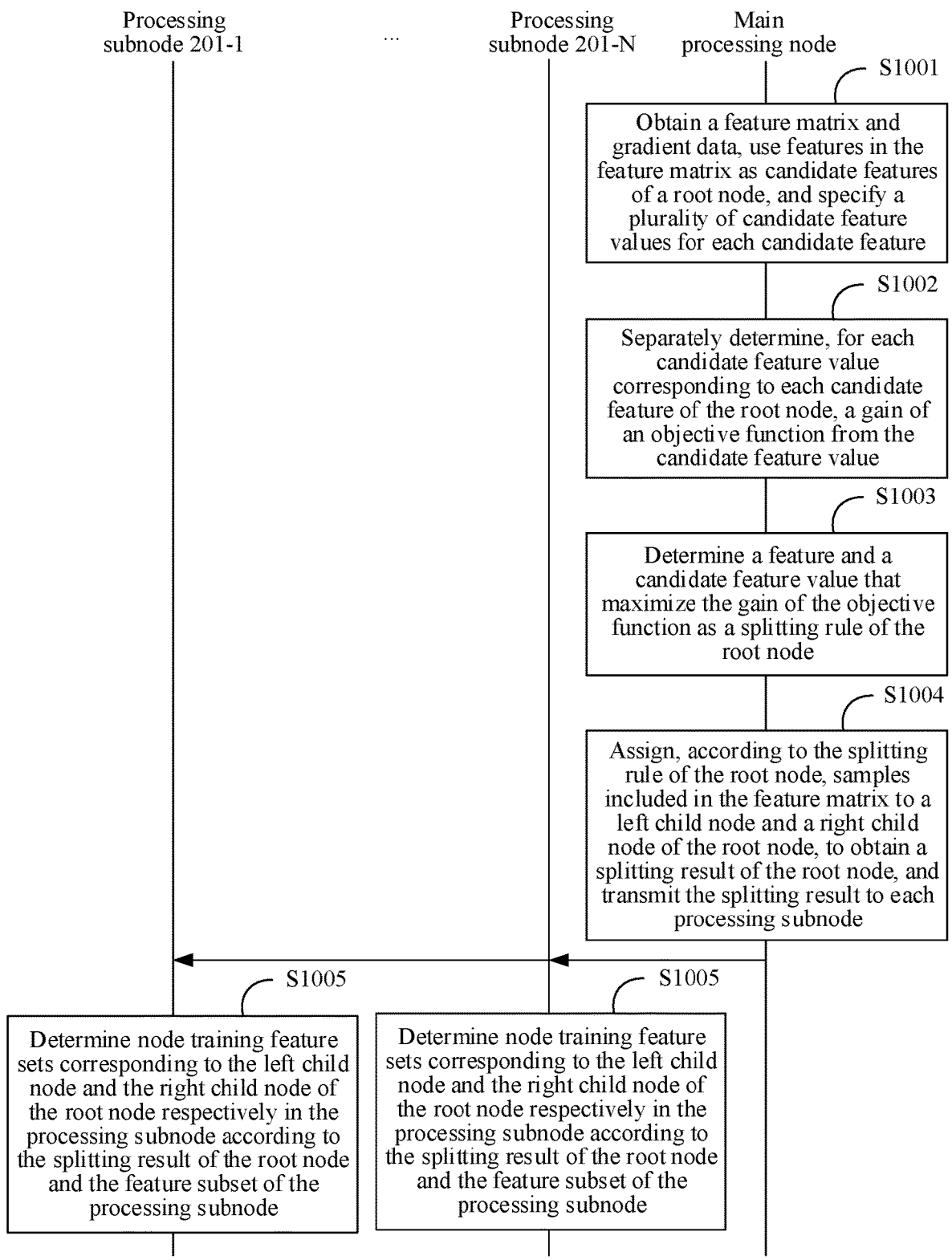
FIG. 10 is a schematic flowchart of determining a splitting rule of a root node of a decision tree according to an embodiment of this application.

In one implementation, the main processing node may determine a splitting rule of a root node of a decision tree. Referring to FIG. 10, step S901 specifically includes the following steps:

S1001. The main processing node obtains a feature matrix and gradient data, uses features in the feature matrix as candidate features of the root node, and specifies a plurality of candidate feature values for each candidate feature.

S1002. The main processing node separately determines, for each candidate feature value corresponding to each candidate feature of the root node, a gain of an objective function from the candidate feature value.

In some embodiments, the main processing node assigns, for the candidate feature value $s_{j,k}$ of the candidate feature j as the splitting point, the sample whose feature value of the feature j in the feature matrix is less than the feature value $s_{j,k}$ to the left set, assigns the sample whose feature value of the feature j is not less than the feature value $s_{j,k}$ to the right set, and determines the gain of the objective function from the candidate feature value $s_{j,k}$ according to the sum of the gradient data of all the samples in the left set and the sum of the gradient data of all the samples in the right set.

In one implementation, the gain of the objective function from the candidate feature value $s_{j,k}$ may be calculated by using the following formula:

$$\text{Gain} = \frac{1}{2}\left[\frac{\left(\sum_{i\in I_L} g_i\right)^2}{\sum_{i\in I_L} h_i + \lambda} + \frac{\left(\sum_{i\in I_R} g_i\right)^2}{\sum_{i\in I_R} h_i + \lambda} - \frac{\left(\sum_{i\in I} g_i\right)^2}{\sum_{i\in I} h_i + \lambda}\right] - \gamma.$$

In one implementation, the gradient histogram corresponding to each feature may be separately counted. For each candidate feature value, the sum of the gradient data of all the samples falling into the left set and the sum of the gradient data of all the samples falling into the right set may be quickly determined based on the gradient histogram.

S1003. The main processing node determines a feature and a candidate feature value that maximize the gain of the objective function as a splitting rule of the root node.

Referring to FIG. 10, step S902 specifically includes the following steps:

S1004. The main processing node assigns, according to the splitting rule of the root node, samples included in the feature matrix to a left child node and a right child node of the root node, to obtain a splitting result of the root node, and transmits the splitting result to each processing subnode.

In one implementation, if the splitting rule of the root node includes the feature j and the feature value $s_{j,k}$, the feature column in the feature matrix is obtained, and samples whose feature values are less than $s_{j,k}$ in the feature column $T_j$ are assigned to the left child node, and samples whose feature values are not less than $s_{j,k}$ in the feature column are assigned to the right child node, to obtain the splitting result of the root node. The splitting result may be represented as (0, 1, 1, 1, 0, . . . ). The $i^{th}$ digit of "0" indicates that the sample i is on the left child node of the root node, and the $i^{th}$ digit of "1" indicates that the sample i is on the right child node of the root node. For example, in the foregoing example, the first "0" indicates that a sample 1 is on the left child node of the root node, the second "1" indicates that a sample 2 is on the right child node of the root node, and so on. By transmitting the splitting results in the foregoing binary coding manner, the size of the transmitted splitting results can be reduced, thereby reducing network transmission overheads.

S1005. Each processing subnode separately determines node training feature sets corresponding to the left child node and the right child node of the root node respectively in the processing subnode according to the splitting result of the root node and the feature subset of the processing subnode.

In some embodiments, the processing procedure of determining, by each processing subnode, node training feature sets corresponding to the left child node and the right child node respectively includes the following: The processing subnode determines, according to the splitting result of the root node, samples assigned to the left child node and the right child node of the root node, obtains, from the feature subset of the processing subnode, a feature column corresponding to the samples assigned to the left child node, to obtain a node training feature set of the left child node of the root node, and obtains, from the feature subset of the processing subnode, a feature column corresponding to the samples assigned to the right child node, to obtain a node training feature set of the right child node of the root node. For specific implementations, refer to FIG. 7A and FIG. 7B, and details are not described again.

In one implementation, the main processing node may alternatively control any processing subnode to perform the foregoing steps, to determine the splitting rule of the root node of the decision tree.

Figure 11:
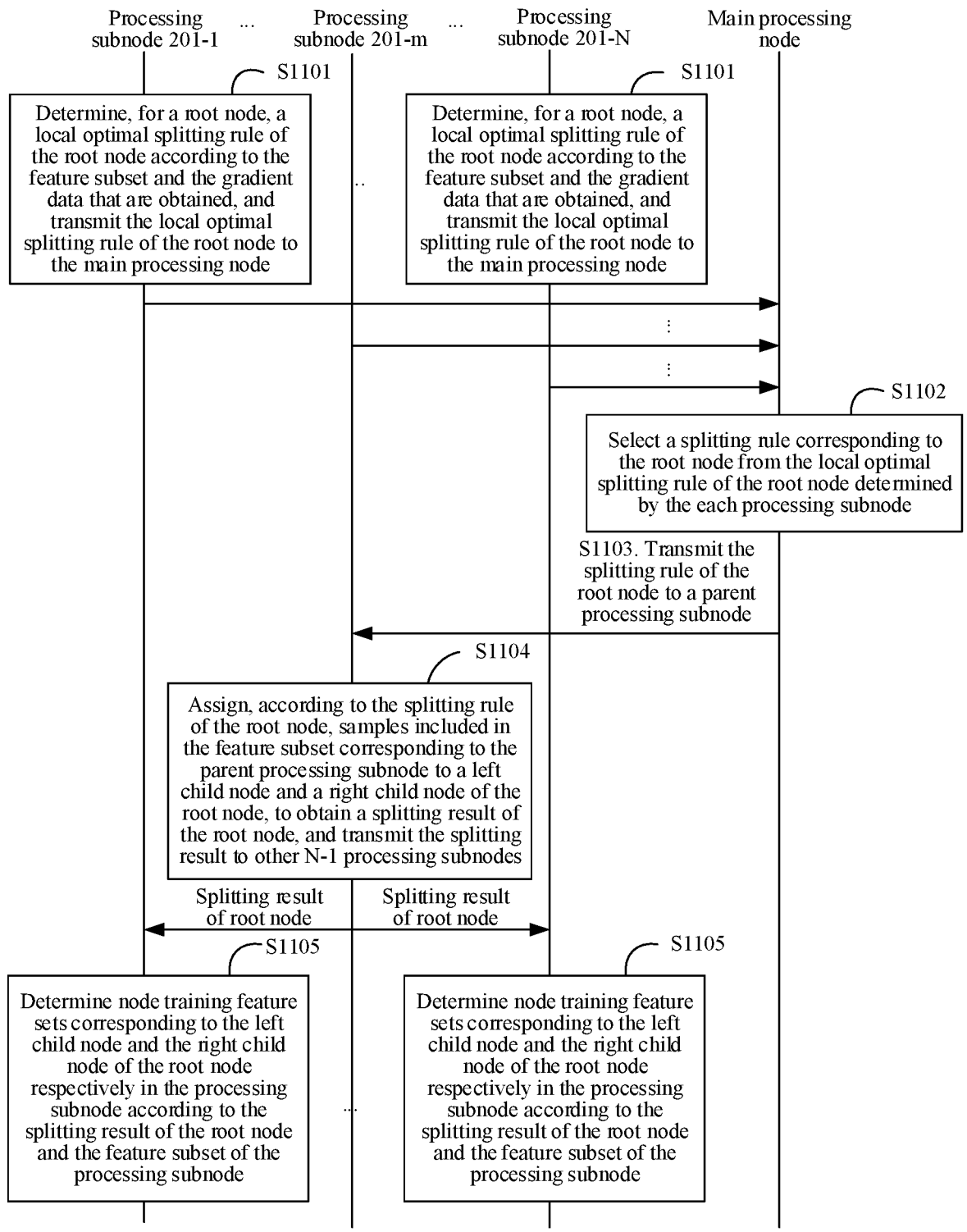
FIG. 11 is a schematic flowchart of determining a splitting rule of a root node in a parallel process according to an embodiment of this application.

In another implementation, to improve processing efficiency, the splitting rule of the root node may be determined in a parallel process. Referring to FIG. 11, step S901 specifically includes the following steps:

S1101. Each processing subnode separately determines, for a root node, a local optimal splitting rule of the root node according to the feature subset and the gradient data of the processing subnode that are obtained, and transmits the local optimal splitting rule of the root node to the main processing node.

The local optimal splitting rule includes the feature and the candidate feature value that maximize the gain of the objective function.

In one implementation, each processing subnode uses the features in the feature subset corresponding to the processing subnode as candidate features, and specifies a plurality of candidate feature values for each candidate feature. With reference to the method in step S1002, the processing subnode may select, from the candidate features and the candidate feature values, the feature and the feature value that maximize the gain of the objective function as the local optimal splitting rule of the root node.

S1102. The main processing node selects a splitting rule corresponding to the root node from the local optimal splitting rule of the root node determined by each of the processing subnode.

In one implementation, the processing subnodes may simultaneously transmit the gains corresponding to the respective determined local optimal splitting rules to the main processing node, and the main processing node selects a local optimal splitting rule with the maximum gain as the splitting rule corresponding to the root node from the local optimal splitting rule of the root node determined by each of the processing subnode.

Referring to FIG. 11, step S902 specifically includes the following steps:

S1103. The main processing node transmits the splitting rule of the root node to a parent processing subnode, the parent processing subnode being a processing subnode corresponding to features in the splitting rule of the root node.

For example, if the features in the splitting rule of the root node are stored in the processing subnode 201-$m$, that is, the splitting rule is transmitted by the processing subnode 201-$m$ to the main processing node, a parent processing subnode is the processing subnode 201-$m$.

S1104. The parent processing subnode assigns, according to the splitting rule of the root node, samples included in the feature subset corresponding to the parent processing subnode to the left child node and the right child node of the root node, to obtain a splitting result of the root node, and transmits the splitting result to other N−1 processing subnodes.

For the specific implementation of step S1104, refer to step S1004.

S1105. Each processing subnode separately determines node training feature sets corresponding to the left child node and the right child node of the root node respectively in the processing subnode according to the splitting result of the root node and the feature subset of the processing subnode.

In some embodiments, the processing procedure of determining, by each processing subnode, node training feature sets corresponding to the left child node and the right child node respectively includes the following. The processing subnode determines, according to the splitting result of the root node, samples assigned to the left child node and the right child node of the root node, obtains, from the feature subset of the processing subnode, a feature column corresponding to the samples assigned to the left child node, to obtain a node training feature set of the left child node of the root node, and obtains, from the feature subset of the processing subnode, a feature column corresponding to the samples assigned to the right child node, to obtain a node training feature set of the right child node of the root node.

For the specific implementation of step S1105, refer to step S1005.

The distributed training system and the training method for a decision tree model that are provided in the embodiments of this application may be used for training any model based on the decision tree. The trained decision tree model may be used for completing the classification task, the regression task, and the like. For example, the trained decision tree model may be specifically used for machine learning classification tasks such as advertisement recommendation, user gender prediction, and image classification, and machine learning regression tasks for predicting values such as user age prediction and user consumption prediction. The user only needs to submit the training task to the distributed training system, and the distributed training system may automatically obtain sample data corresponding to the training task from the data storage server based on the training task. The main processing node controls processing subnodes to complete the training task in a parallel manner, and the user may quickly obtain the trained decision tree model without excessive operations, thereby improving the training efficiency.

As shown in FIG. 12, according to embodiment consistent with the foregoing training method for a decision tree model, an embodiment of this application further provides a training system 120 for a decision tree model. The training system 120 for a decision tree model includes N processing subnodes 1201 and a main processing node 1202, N being a positive integer greater than or equal to 2.

In one implementation, the processing subnodes 1201 and the main processing node 1202 are connected to each other through a communication network. Each processing subnode 1201 may be a server, a server cluster formed by a plurality of servers, or a cloud computing center. The main processing node 1202 may be a server, a server cluster formed by a plurality of servers, or a cloud computing center.

In one implementation, the training system 120 for a decision tree model may alternatively be a blockchain. One processing subnode 1201 corresponds to one node in the blockchain, and one node in the blockchain is specified as the main processing node 1202. In an example, both the processing subnode 1201 and the main processing node 1202 are electronic devices.

The processing subnode 1201 is configured to obtain, for a currently being trained tree node, a node training feature set and gradient data of the currently being trained tree node. The gradient data is gradient data of a feature matrix of the decision tree model, and the node training feature set is determined by a splitting rule of a previously trained tree node and a feature subset of the processing subnode. The feature subset includes a plurality of feature columns $T_j$, and the feature columns $T_j$ include feature values of features j of all samples. All the N processing subnodes 1201 participate in training, respective feature subsets of the N processing subnodes form the feature matrix, and the feature subsets of the N processing subnodes do not intersect with each other.

The processing subnode 1201 is further configured to: determine a local optimal splitting rule for the currently being trained tree node according to the node training feature set and the gradient data that are obtained, and transmit the local optimal splitting rule to the main processing node 1202, the local optimal splitting rule including a feature and a feature value that maximize a gain of an objective function.

The main processing node 1202 is configured to select a splitting rule corresponding to the currently being trained tree node from the local optimal splitting rule determined by each of the processing subnode 1201.

The processing subnode 1201 is further configured to: obtain a feature subset and gradient data of the processing subnode before the node training feature set and the gradient data of the currently being trained tree node are obtained for the currently being trained tree node; and determine, for a root node, a local optimal splitting rule of the root node according to the feature subset and the gradient data that are obtained, and transmit the local optimal splitting rule of the root node to the main processing node 1202.

Correspondingly, the main processing node 1202 selects a splitting rule corresponding to the root node from the local optimal splitting rule of the root node determined by each of the processing subnode 1201, and transmits the splitting rule corresponding to the root node to each of the processing subnode 1201.

The processing subnode 1201 is specifically configured to:
obtain data of a specified quantity of rows corresponding to the processing subnode from the feature matrix, a feature value corresponding to a feature j of an $i^{th}$ sample being stored in an $i^{th}$ row and a $j^{th}$ column in the feature matrix;
divide the obtained data of the specified quantity of rows into N feature sub-matrices based on columns according to a preset division mode;
preserve a feature sub-matrix of the processing subnode, and respectively transmit N−1 feature sub-matrices to corresponding other processing subnodes;
receive feature sub-matrices transmitted by the other N−1 processing subnodes to the processing subnode; and
merge all feature sub-matrices corresponding to the processing subnode, to obtain the feature subset of the processing subnode.

The main processing node 1202 is further configured to transmit a splitting rule of a parent node corresponding to the currently being trained tree node to a parent processing subnode, the parent processing subnode being a processing subnode corresponding to features in the splitting rule of the parent node.

Correspondingly, the parent processing subnode is configured to: assign, according to the splitting rule of the parent node, samples included in a node training feature set of the parent node corresponding to the parent processing subnode to two child nodes of the parent node, to obtain a splitting result of the parent node, and transmit the splitting result of the parent node to other processing subnodes.

The processing subnode 1201 is further configured to: determine, according to the splitting result of the parent node, samples assigned to the currently being trained tree node, and obtain, from the feature subset of the processing subnode, a feature column corresponding to the samples assigned to the currently being trained tree node, to obtain the node training feature set of the currently being trained tree node.

The parent processing subnode is further configured to perform compression coding on the splitting result of the parent node in a binary coding manner before the splitting result of the parent node is transmitted to the other processing subnodes.

The processing subnode 1201 is specifically configured to:
obtain a gradient histogram corresponding to each feature in the node training feature set of the currently being trained tree node, a horizontal axis of the gradient histogram being a candidate feature value, and a vertical axis of the gradient histogram being a sum of gradient data of samples with feature values between two adjacent candidate feature values;
divide, for each candidate feature value corresponding to each of the feature respectively, the gradient histogram corresponding to the feature into a left gradient histogram and a right gradient histogram by using the candidate feature value as a splitting point, and determine a gain of the objective function from the candidate feature value according to a sum of gradient data of the left gradient histogram and a sum of gradient data of the right gradient histogram; and
determine the feature and the candidate feature value that maximize the gain of the objective function as the local optimal splitting rule.

The processing subnode 1201 is specifically configured to:
obtain a gradient histogram corresponding to each feature of a parent node of the currently being trained tree node and a gradient histogram corresponding to each feature of another child node of the parent node; and
determine, for each feature respectively, a difference between the gradient histogram of the feature of the parent node and the gradient histogram of the feature of another child node as the gradient histogram corresponding to each feature in the node training feature set of the currently being trained tree node.

The training system for a decision tree model provided in this embodiment and the foregoing training method for a decision tree model share various designs, and the same beneficial effects can be obtained. Details are not described herein again.

Figure 13:
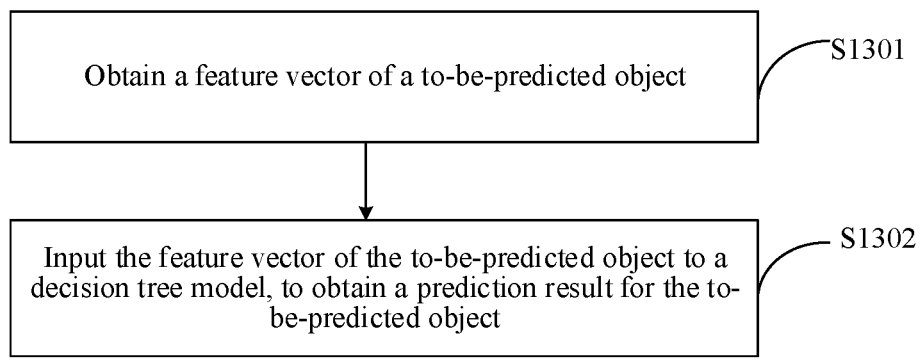
FIG. 13 is a schematic flowchart of a prediction method based on a decision tree model according to an embodiment of this application.

Referring to FIG. 13, according to embodiment consistent with the foregoing training method for a decision tree model, an embodiment of this application provides a prediction method based on a decision tree model, performed by an electronic device described below, the method including the following steps:

S1301. Obtain a feature vector of a to-be-predicted object.

The feature vector includes feature values of a plurality of features corresponding to the to-be-predicted object.

In one implementation, the feature vector of the to-be-predicted object is determined according to a prediction task corresponding to a decision tree model. In some embodiments, the feature vector of the to-be-predicted object is related to the features in the splitting rule of each tree node in the decision tree model. For example, if the splitting rule of the tree node in the decision tree model includes a feature 1, a feature 2 and a feature 3, the feature vector of the to-be-predicted object needs to include feature values corresponding to the feature 1, the feature 2, and the feature 3, respectively.

S1302. Input the feature vector of the to-be-predicted object to the decision tree model, to obtain a prediction result for the to-be-predicted object.

The decision tree model in step S1301 is a model trained by using any training method for a decision tree model according to the embodiments of this application.

In one implementation, a type of the prediction result for the to-be-predicted object is determined according to the prediction task of the decision tree model. For example, when the prediction task of the decision tree model is a classification task, a prediction result is a category corresponding to the to-be-predicted object; and when the prediction task of the decision tree model is a regression task, the prediction result is a predicted value corresponding to the to-be-predicted object.

Further, on the basis of obtaining the prediction result, information corresponding to the prediction result is pushed to the to-be-predicted object.

For example, when the prediction task is to predict a commodity liked by the user, features in a feature vector of the to-be-predicted user may include an educational background, an income, a type of work, a height, a weight, and an age. During prediction, information such as an educational background, an income, a type of work, a height, a weight, and an age is obtained from information of the to-be-predicted user, and the information is inputted to the decision tree model, to obtain a prediction result for the user. The prediction result represents a commodity type that the user may like, and then, commodities liked by the user are recommend to the user based on the prediction result.

For example, when the prediction task is to predict the age of the user, features in the feature vector of the to-be-predicted user may include a purchase record, an income, a height, a weight, a facial feature, and the like. During prediction, information such as a purchase record, an income, a height, a weight, and a facial feature of the to-be-predicted user is obtained, and the information is inputted into the decision tree model, to predict the age of the user. Then, commodities, music, medical care, and other information liked by the age group are recommend based on the age of the user.

According to embodiment consistent with the foregoing prediction method based on a decision tree model, an embodiment of this application further provides a prediction apparatus based on a decision tree model, the apparatus including a data obtaining module and a prediction module.

The data obtaining module is configured to obtain a feature vector of a to-be-predicted object.

The prediction module is configured to input the feature vector of the to-be-predicted object to a trained decision tree model, to obtain a prediction result for the to-be-predicted object. The decision tree model is a model trained by using any training method for a decision tree model according to the embodiments of this application.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

According to embodiment consistent with foregoing prediction method based on a decision tree model, an embodiment of this application further provides an electronic device. The electronic device may be specifically a desktop computer, a portable computer, a smartphone, a tablet computer, a personal digital assistant (PDA), a server, or the like. The electronic device may include a processor and a memory.

The processor may be a general purpose processor, for example, a central processing unit (CPU), a digital signal processor (DSP), an application-specific integrated circuit (ASIC), a field programmable gate array (FPGA), another programmable logic device, a discrete gate, a transistor logic device, or a discrete hardware component, and may implement or perform the methods, steps, and logical block diagrams disclosed in the embodiments of this application The general purpose processor may be a microprocessor or any conventional processor, or the like. Steps of the methods disclosed with reference to the embodiments of this application may be directly performed and completed by a hardware processor, or may be performed and completed by using a combination of hardware and a software module in the processor.

The memory, as a non-transitory computer-readable storage medium, may be configured to store a non-transitory software program, a non-transitory computer-executable program and a module. The memory may include at least one type of storage media, for example, may include: a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, and the like. The memory is any other medium that can carry, or store expected program code in a form of an instruction or a data structure and can be accessed by a computer, but is not limited thereto. The memory according to this embodiment may be further a circuit or any other apparatus that can implement a storage function, and is configured to store program instructions and/or data.

According to the training method and system for a decision tree model, the storage medium, and the prediction method provided in the embodiments of this application, the feature value of the sample is read based on columns, that is, the feature matrix is divided according to features, so that the feature subset in each processing subnode includes the feature values of all the samples corresponding to a plurality of features. Therefore, each processing subnode may determine the local optimal splitting rule based on the feature subset obtained by the processing subnode and transmit the local optimal splitting rule to the main processing node. Because the local optimal splitting rule includes only one determined feature and one determined feature value, the quantity of data transmitted by the processing subnode to the main processing node is very small, thereby reducing the communication overheads of the system. In addition, the processing subnodes does not need to store the global gradient histogram. Each processing subnode stores only a part (that is, a feature subset) in the feature matrix, and the feature subsets stored on the processing subnodes do not intersect with each other, thereby greatly reducing the memory overheads of the system.

An embodiment of this application provides a computer program product or a computer program. The computer program product or the computer program includes computer instructions, and the computer instructions are stored in a computer-readable storage medium. A processor of an electronic device reads the computer instructions from the computer-readable storage medium, and the processor executes the computer instructions, to cause the computer device to perform the foregoing training method for a decision tree model or prediction method based on a decision tree model.

An embodiment of this application provides a computer-readable storage medium, configured to store computer program instructions used by the foregoing electronic device, and including a program for performing the foregoing training method for a decision tree model or prediction method based on a decision tree model.

The foregoing computer-readable storage medium may be any computer-accessible usable medium or a data storage device, includes but not limited to a magnetic memory (for example, a floppy disk, a hard disk, a magnetic tape, or a magneto-optical (MO) disk), an optical memory (for example, a CD, a DVD, a BD, or an HVD), and a semiconductor memory (for example, a ROM, an EPROM, an EEPROM, a non-volatile memory (NAND FLASH), or a solid-state disk (SSD)).

The foregoing embodiments are merely used for describing the technical solutions of this application. The descriptions of the foregoing embodiments are merely intended to help understand the methods of the embodiments of this application, and are not to be construed as a limitation on the embodiments of this application. Any variation or replacement readily figured out by a person skilled in the art is to fall within the protection scope of the embodiments of this application.

What is claimed is:

1. A training method for a decision tree model, performed by a training system in a distributed computing environment, the training system comprising N processing subnodes and a main processing node, N being a positive integer greater than 1, each processing subnode being a computing device comprising at least a memory and a processor configured to perform training by using assigned training data, and the method comprising:

separately obtaining, from a data storage server of the training system by each processing subnode for a currently being trained tree node, a node training feature set and gradient data of the currently being trained tree node, the gradient data being gradient data of a feature matrix of the decision tree model, the node training feature set being determined by a splitting rule of a previously trained tree node and a feature subset of the processing subnode, the feature subset comprising a plurality of feature columns $T_j$, the feature columns $T_j$ comprising feature values of features j of all samples, respective feature subsets of the N processing subnodes forming the feature matrix, and the feature subsets of the N processing subnodes not intersecting with each other, wherein each of the processing subnodes stores only the respective feature subset which is a part of the feature matrix divided based on columns;

separately determining, by each of the processing subnodes in parallel, a local splitting rule for the currently being trained tree node according to the node training feature set and the gradient data that are obtained, and transmitting, by each of the processing subnodes, the local splitting rule to the main processing node, the local splitting rule comprising a feature and a feature value that maximize a gain of an objective function, wherein each of the processing subnodes only transmits the local splitting rule to the main processing node without storing or transmitting a global gradient histogram; and selecting, by the main processing node, a splitting rule corresponding to the currently being trained tree node of the decision tree model from the local splitting rule determined by each of the processing subnode, wherein after the decision tree model is trained, the method further comprises:

determining a feature vector of a to-be-predicted object based on a prediction task corresponding to the decision tree model and features in the splitting rule of each tree node in the decision tree model; and obtaining a prediction result for the to-be-predicted object by inputting the feature vector of the to-be-predicted object to the decision tree model, wherein when the prediction task of the decision tree model is a classification task, the prediction result is a category corresponding to the to-be-predicted object; and when the prediction task of the decision tree model is a regression task, the prediction result is a predicted value corresponding to the to-be-predicted object.

2. The method according to claim 1, the method further comprises:

separately obtaining, by each of the processing subnode, the feature subset and gradient data of the processing subnode;

separately determining, by each of the processing subnode for a root node, a local splitting rule of the root node according to the feature subset and the gradient data that are obtained, and transmitting the local splitting rule of the root node to the main processing node; and selecting, by the main processing node, a splitting rule corresponding to the root node from the local splitting rule of the root node determined by each of the processing subnode, and transmitting the selected splitting rule corresponding to the root node to each of the processing subnode.

3. The method according to claim 2, wherein the obtaining, by each of the processing subnode, the feature subset of the processing subnode comprises:

obtaining data of a specified quantity of rows corresponding to the processing subnode from the feature matrix, a feature value corresponding to a feature j of an $i^{th}$ sample being stored in an $i^{th}$ row and a $j^{th}$ column in the feature matrix;

dividing the obtained data of the specified quantity of rows into N feature sub-matrices based on columns according to a preset division mode;

preserving a feature sub-matrix of the processing subnode, and respectively transmitting N−1 feature sub-matrices to corresponding other processing subnodes;

receiving feature sub-matrices transmitted by the other N−1 processing subnodes to the processing subnode; and merging all feature sub-matrices corresponding to the processing subnode, to obtain the feature subset of the processing subnode.

4. The method according to claim 1, wherein the node training feature set of the currently being trained tree node of each of the processing subnode is determined by:

transmitting, by the main processing node, a splitting rule of a parent node corresponding to the currently being trained tree node to a parent processing subnode, the parent processing subnode being a processing subnode corresponding to features in the splitting rule of the parent node;

assigning, by the parent processing subnode according to the splitting rule of the parent node, samples comprised in a node training feature set of the parent node corresponding to the parent processing subnode to two child nodes of the parent node, to obtain a splitting result of the parent node, and transmitting the splitting result of the parent node to other processing subnodes, wherein a transmission communication traffic volume of the splitting result is only related to a quantity of the samples; and separately determining, by each of the other processing subnodes according to the splitting result of the parent node, samples assigned to the currently being trained tree node, and obtaining, from the feature subset of the processing subnode, a feature column corresponding to the samples assigned to the currently being trained tree node, to obtain the node training feature set of the currently being trained tree node.

5. The method according to claim 4, wherein before the transmitting the splitting result of the parent node to other processing subnodes, the method further comprises:

performing compression coding on the splitting result of the parent node using a binary coding method, comprising:

using a first value for an $i^{th}$ digit in response to that a sample corresponding to the $i^{th}$ row in the node training feature set of the parent node is on a left child node of the parent node, and using a second value for the $i^{th}$ digit in response to that the sample corresponding to the $i^{th}$ row in the node training feature set of the parent node is on a right child node of the parent node.

6. The method according to claim 1, wherein the determining a local splitting rule according to the node training feature set and the gradient data that are obtained further comprises:

obtaining a gradient histogram corresponding to each feature in the node training feature set of the currently being trained tree node, a horizontal axis of the gradient histogram being a candidate feature value, and a vertical axis of the gradient histogram being a sum of gradient data of samples with feature values between two adjacent candidate feature values;

dividing, for each candidate feature value corresponding to each of the feature respectively, the gradient histogram corresponding to the feature into a left gradient histogram and a right gradient histogram by using the candidate feature value as a splitting point, and determining a gain of the objective function from the candidate feature value according to a sum of gradient data of the left gradient histogram and a sum of gradient data of the right gradient histogram; and determining the feature and the candidate feature value that maximize the gain of the objective function as the local splitting rule.

7. The method according to claim 6, wherein the obtaining a gradient histogram corresponding to each feature in the node training feature set of the currently being trained tree node further comprises:

obtaining a gradient histogram corresponding to each feature of a parent node of the currently being trained tree node and a gradient histogram corresponding to each feature of another child node of the parent node; and determining, for each feature respectively, a difference between the gradient histogram of the feature of the parent node and the gradient histogram of the feature of another child node as the gradient histogram corresponding to each feature in the node training feature set of the currently being trained tree node.

8. The method according to claim 1, wherein the feature vector comprises feature values of a plurality of features corresponding to the to-be-predicted object.

9. A training system for a decision tree model, comprising N processing subnodes and a main processing node, N being a positive integer greater than 1, each processing subnode being a computing device comprising at least a memory and a processor configured to obtain, from a data storage server of the training system for a currently being trained tree node, a node training feature set and gradient data of the currently being trained tree node, the gradient data being gradient data of a feature matrix of the decision tree model, the node training feature set being determined by a splitting rule of a previously trained tree node and a feature subset of the processing subnode, the feature subset comprising a plurality of feature columns $T_j$, the feature columns $T_j$ comprising feature values of features j of all samples, respective feature subsets of the N processing subnodes forming the feature matrix, and the feature subsets of the N processing subnodes not intersecting with each other, wherein each of the processing subnodes stores only the respective feature subset which is a part of the feature matrix divided based on columns;

the processor of each of the processing subnode being further configured to: determine, in parallel, a local splitting rule for the currently being trained tree node according to the node training feature set and the gradient data that are obtained, and transmit the local optimal splitting rule to the main processing node, the local splitting rule comprising a feature and a feature value that maximize a gain of an objective function, wherein each of the processing subnodes only transmits the local splitting rule to the main processing node without storing or transmitting a global gradient histogram; and the main processing node being configured to select a splitting rule corresponding to the currently being trained tree node of the decision tree model from the local splitting rule determined by each of the processing subnode, wherein the node training feature set of the currently being trained tree node of each of the processing subnode is determined by:

transmitting, by the main processing node, a splitting rule of a parent node corresponding to the currently being trained tree node to a parent processing subnode, the parent processing subnode being a processing subnode corresponding to features in the splitting rule of the parent node;

assigning, by the parent processing subnode according to the splitting rule of the parent node, samples comprised in a node training feature set of the parent node corresponding to the parent processing subnode to two child nodes of the parent node, to obtain a splitting result of the parent node;

performing compression coding on the splitting result of the parent node;

transmitting the splitting result of the parent node after the compression coding to other processing subnodes, wherein a transmission communication traffic volume of the splitting result is only related to a quantity of the samples; and separately determining, by each of the other processing subnodes according to the splitting result of the parent node, samples assigned to the currently being trained tree node, and obtaining, from the feature subset of the processing subnode, a feature column corresponding to the samples assigned to the currently being trained tree node, to obtain the node training feature set of the currently being trained tree node.

10. The system according to claim 9, wherein the processing subnode is specifically configured to:
obtain data of a specified quantity of rows corresponding to the processing subnode from the feature matrix, a feature value corresponding to a feature j of an $i^{th}$ sample being stored in an $i^{th}$ row and a $j^{th}$ column in the feature matrix;
divide the obtained data of the specified quantity of rows into N feature sub-matrices based on columns according to a preset division mode;
preserve a feature sub-matrix of the processing subnode, and respectively transmit N−1 feature sub-matrices to corresponding other processing subnodes;
receive feature sub-matrices transmitted by the other N−1 processing subnodes to the processing subnode; and
merge all feature sub-matrices corresponding to the processing subnode, to obtain the feature subset of the processing subnode.

11. A non-transitory computer-readable storage medium, storing computer program instructions, the computer program instructions, when being executed by at least one processor of a training system in a distributed computing environment, the training system comprising N processing subnodes and a main processing node, N being a positive integer greater than 1, each processing subnode being a computing device comprising at least a memory and a processor configured to perform training by using assigned training data, the computer program instructions causing the at least one processor to implement:
separately obtaining, from a data storage server of the training system by each processing subnode for a currently being trained tree node, a node training feature set and gradient data of the currently being trained tree node, the gradient data being gradient data of a feature matrix of the decision tree model, the node training feature set being determined by a splitting rule of a previously trained tree node and a feature subset of the processing subnode, the feature subset comprising a plurality of feature columns $T_j$, the feature columns $T_j$ comprising feature values of features j of all samples, respective feature subsets of the N processing subnodes forming the feature matrix, and the feature subsets of the N processing subnodes not intersecting with each other, wherein each of the processing subnodes stores only the respective feature subset which is a part of the feature matrix divided based on columns;
separately determining, by each of the processing subnodes in parallel, a local splitting rule for the currently being trained tree node according to the node training feature set and the gradient data that are obtained, and transmitting, by each of the processing subnodes, the local splitting rule to the main processing node, the local splitting rule comprising a feature and a feature value that maximize a gain of an objective function, wherein each of the processing subnodes only transmits the local splitting rule to the main processing node without storing or transmitting a global gradient histogram; and
selecting, by the main processing node, a splitting rule corresponding to the currently being trained tree node of the decision tree model from the local splitting rule determined by each of the processing subnode,
wherein after the decision tree model is trained, the computer program instructions further cause the at least one processor to implement:
determining a feature vector of a to-be-predicted object based on a prediction task corresponding to the decision tree model and features in the splitting rule of each tree node in the decision tree model; and
obtaining a prediction result for the to-be-predicted object by inputting the feature vector of the to-be-predicted object to the decision tree model, wherein when the prediction task of the decision tree model is a classification task, the prediction result is a category corresponding to the to-be-predicted object; and when the prediction task of the decision tree model is a regression task, the prediction result is a predicted value corresponding to the to-be-predicted object.

12. The storage medium according to claim 11, wherein the computer program instructions further cause the at least one processor to implement:
separately obtaining, by each of the processing subnode, the feature subset and gradient data of the processing subnode;
separately determining, by each of the processing subnode for a root node, a local splitting rule of the root node according to the feature subset and the gradient data that are obtained, and transmitting the local splitting rule of the root node to the main processing node; and
selecting, by the main processing node, a splitting rule corresponding to the root node from the local splitting rule of the root node determined by each of the processing subnode, and transmitting the selected splitting rule corresponding to the root node to each of the processing subnode.

13. The storage medium according to claim 12, wherein the obtaining, by each of the processing subnode, the feature subset of the processing subnode comprises:
obtaining data of a specified quantity of rows corresponding to the processing subnode from the feature matrix, a feature value corresponding to a feature j of an $i^{th}$ sample being stored in an $i^{th}$ row and a $j^{th}$ column in the feature matrix;
dividing the obtained data of the specified quantity of rows into N feature sub-matrices based on columns according to a preset division mode;
preserving a feature sub-matrix of the processing subnode, and respectively transmitting N−1 feature sub-matrices to corresponding other processing subnodes;
receiving feature sub-matrices transmitted by the other N−1 processing subnodes to the processing subnode; and
merging all feature sub-matrices corresponding to the processing subnode, to obtain the feature subset of the processing subnode.

14. The storage medium according to claim 11, wherein the node training feature set of the currently being trained tree node of each of the processing subnode is determined by:
transmitting, by the main processing node, a splitting rule of a parent node corresponding to the currently being trained tree node to a parent processing subnode, the parent processing subnode being a processing subnode corresponding to features in the splitting rule of the parent node;
assigning, by the parent processing subnode according to the splitting rule of the parent node, samples comprised in a node training feature set of the parent node corresponding to the parent processing subnode to two child nodes of the parent node, to obtain a splitting result of the parent node, and transmitting the splitting result of the parent node to other processing subnodes, wherein a transmission communication traffic volume of the splitting result is only related to a quantity of the samples; and separately determining, by each of the other processing subnodes according to the splitting result of the parent node, samples assigned to the currently being trained tree node, and obtaining, from the feature subset of the processing subnode, a feature column corresponding to the samples assigned to the currently being trained tree node, to obtain the node training feature set of the currently being trained tree node.

15. The storage medium according to claim 14, wherein before the transmitting the splitting result of the parent node to other processing subnodes, the computer program instructions further cause the at least one processor to implement:

performing compression coding on the splitting result of the parent node using a binary coding method, comprising:

using a first value for an $i^{th}$ digit in response to that a sample corresponding to the $i^{th}$ row in the node training feature set of the parent node is on a left child node of the parent node, and using a second value for the $i^{th}$ digit in response to that the sample corresponding to the $i^{th}$ row in the node training feature set of the parent node is on a right child node of the parent node.

16. The storage medium according to claim 11, wherein the determining a local splitting rule according to the node training feature set and the gradient data that are obtained further comprises:

obtaining a gradient histogram corresponding to each feature in the node training feature set of the currently being trained tree node, a horizontal axis of the gradient histogram being a candidate feature value, and a vertical axis of the gradient histogram being a sum of gradient data of samples with feature values between two adjacent candidate feature values;

dividing, for each candidate feature value corresponding to each of the feature respectively, the gradient histogram corresponding to the feature into a left gradient histogram and a right gradient histogram by using the candidate feature value as a splitting point, and determining a gain of the objective function from the candidate feature value according to a sum of gradient data of the left gradient histogram and a sum of gradient data of the right gradient histogram; and determining the feature and the candidate feature value that maximize the gain of the objective function as the local splitting rule.

17. The storage medium according to claim 16, wherein the obtaining a gradient histogram corresponding to each feature in the node training feature set of the currently being trained tree node further comprises:

obtaining a gradient histogram corresponding to each feature of a parent node of the currently being trained tree node and a gradient histogram corresponding to each feature of another child node of the parent node; and determining, for each feature respectively, a difference between the gradient histogram of the feature of the parent node and the gradient histogram of the feature of another child node as the gradient histogram corresponding to each feature in the node training feature set of the currently being trained tree node.

18. The method according to claim 1, wherein a data volume of the samples is greater than 100 million pieces.

19. The training system according to claim 9, wherein performing compression coding on the splitting result of the parent node comprises: using a binary coding method, including:

using a first value for an $i^{th}$ digit in response to that a sample corresponding to the $i^{th}$ row in the node training feature set of the parent node is on a left child node of the parent node, and using a second value for the $i^{th}$ digit in response to that the sample corresponding to the $i^{th}$ row in the node training feature set of the parent node is on a right child node of the parent node.

* * * * *